United States Patent
Beck et al.

(10) Patent No.: US 11,028,904 B2
(45) Date of Patent: Jun. 8, 2021

(54) TRANSMISSION FOR A MOTOR VEHICLE

(71) Applicant: ZF Friedrichshafen AG, Friedrichshafen (DE)

(72) Inventors: Stefan Beck, Eriskirch (DE); Johannes Kaltenbach, Friedrichshafen (DE); Michael Wechs, Weissensberg (DE); Michael Trübenbach, Friedrichshafen (DE); Kai Bornträger, Langenargen (DE); Johannes Glückler, Friedrichshafen (DE); Jens Moraw, Markdorf (DE); Gerhard Niederbrucker, Friedrichshafen (DE); Peter Ziemer, Tettnang (DE)

( * ) Notice: Subject to any disclaimer, the term of this patent is extended or adjusted under 35 U.S.C. 154(b) by 0 days.

(21) Appl. No.: 16/607,387

(22) PCT Filed: Mar. 26, 2018

(86) PCT No.: PCT/EP2018/057564
§ 371 (c)(1),
(2) Date: Oct. 23, 2019

(87) PCT Pub. No.: WO2018/197126
PCT Pub. Date: Nov. 1, 2018

(65) Prior Publication Data
US 2020/0132171 A1    Apr. 30, 2020

(30) Foreign Application Priority Data
Apr. 24, 2017    (DE) .................... 10 2017 206 836.1

(51) Int. Cl.
*F16H 3/62*    (2006.01)

(52) U.S. Cl.
CPC ....... *F16H 3/62* (2013.01); *F16H 2200/0069* (2013.01); *F16H 2200/2012* (2013.01);
(Continued)

(58) Field of Classification Search
CPC .............. F16H 3/62; F16H 2200/0069; F16H 2200/2012; F16H 2200/2046;
(Continued)

(56) References Cited

U.S. PATENT DOCUMENTS 6,960,149 B2    11/2005 Ziemer
8,016,713 B2    9/2011 Phillips et al.
(Continued)

FOREIGN PATENT DOCUMENTS

DE    101 15 995 A1    10/2002
DE    10 2008 032 469 A1    1/2009
(Continued)

OTHER PUBLICATIONS

Thomas Belz: "Varianten von Mehrgang-Planetengetrieben", Mar. 8, 2016 See International Search.
(Continued)

*Primary Examiner* — David J Hlavka
(74) *Attorney, Agent, or Firm* — Finch & Maloney, PLLC; Michael J. Bujold

(57) ABSTRACT

A transmission (G) for a motor vehicle. The transmission (G) comprises a transmission input (GW1-A), a transmission output (GW2-A), first, second, third and fourth planetary gearsets (P1, P2, P3, P4) and first, second, third, fourth, fifth and sixth shift elements (B1, B2, K1, K2, K3, K4). Ten forward gears and one reverse gear can be achieved between the transmission input (GW1-A) and the transmission output (GW2-A) by selectively operating the six shift elements (B1, B2, K1, K2, K3, K4). A drive train for a motor vehicle having such a transmission (G) is also disclosed.

16 Claims, 16 Drawing Sheets

(52) U.S. Cl.
CPC ............... *F16H 2200/2046* (2013.01); *F16H 2200/2094* (2013.01)

(58) Field of Classification Search
CPC ..... F16H 2200/2094; F16H 2200/2064; F16H 3/666; F16H 3/66; B60K 6/365; B60K 6/45; B60K 2006/4825
See application file for complete search history.

(56) References Cited

U.S. PATENT DOCUMENTS

| | | | | |
|---|---|---|---|---|
| 8,545,362 | B1* | 10/2013 | Goleski | F16H 3/66 475/277 |
| 9,163,705 | B1 | 10/2015 | Hwang et al. | |
| 9,506,533 | B2 | 11/2016 | Park et al. | |
| 9,822,856 | B2 | 11/2017 | Hoffman | |
| 2010/0069191 | A1* | 3/2010 | Swales | B60K 6/547 475/5 |
| 2010/0113761 | A1* | 5/2010 | Khvorova | C12N 15/111 536/24.5 |
| 2013/0040776 | A1* | 2/2013 | Mellet | F16H 3/66 475/275 |
| 2014/0106923 | A1* | 4/2014 | Borgerson | F16H 3/62 475/275 |
| 2014/0106925 | A1* | 4/2014 | Mellet | F16H 3/62 475/277 |
| 2014/0141925 | A1* | 5/2014 | Hart | F16H 3/62 475/276 |
| 2014/0248989 | A1* | 9/2014 | Hart | F16H 3/62 475/276 |
| 2016/0169342 | A1 | 6/2016 | Cho et al. | |

FOREIGN PATENT DOCUMENTS

| | | |
|---|---|---|
| DE | 10 2010 007 613 A1 | 11/2010 |
| DE | 10 2014 214 212 A1 | 1/2015 |
| DE | 10 2014 108 826 A1 | 12/2015 |
| DE | 10 2014 117 679 A1 | 3/2016 |
| JP | 2015-194196 A | 11/2015 |
| JP | 2015-197207 A | 11/2015 |
| KR | 10-2016-0072696 A | 6/2016 |

OTHER PUBLICATIONS

German Search Report Corresponding to 10 2017 206 836.1 dated Nov. 23, 2017.
German Search Report Corresponding to 10 2017 206 803.5 dated Nov. 23, 2017.
German Search Report Corresponding to 10 2017 206 816.7 dated Nov. 23, 2017.
International Search Report Corresponding to PCT/EP2018/057564 dated Jul. 9, 2018.
International Search Report Corresponding to PCT/EP2018/057565 dated Jul. 16, 2018.
International Search Report Corresponding to PCT/EP2018/057563 dated Jul. 10, 2018.
Written Opinion Corresponding to to PCT/EP2018/057564 dated Jul. 9, 2018.
Written Opinion Corresponding to PCT/EP2018/057565 dated Jul. 16, 2018.
Written Opinion Corresponding to PCT/EP2018/057563 dated Jul. 10, 2018.

* cited by examiner

| GEAR | B1 | B2 | K1 | K2 | K3 | K4 |
|---|---|---|---|---|---|---|
| 1 | x | x |  | x |  | x |
| 2 | x | x |  |  | x | x |
| 3 |  | x |  | x | x | x |
| 4 |  | x | x |  | x | x |
| 5 |  | x | x | x |  | x |
| 6 |  | x | x | x | x |  |
| 7 |  |  | x | x | x | x |
| 8 | x |  | x | x | x |  |
| 9 | x |  | x | x |  | x |
| 10 | x |  | x |  | x | x |
| R1 | x | x |  | x | x |  |

TRANSMISSION FOR A MOTOR VEHICLE

This application is a National Stage completion of PCT/EP2018/057564 filed Mar. 26, 2018, which claims priority from German patent application serial no. 10 2017 206 836.1 filed Apr. 24, 2017.

FIELD OF THE INVENTION

The invention relates to a transmission for a motor vehicle, comprising a transmission input and a transmission output, and a first, a second, a third and a fourth planetary gearset, wherein the planetary gearsets each comprise a plurality of elements, wherein the first element of the respective planetary gearsets is formed by a sun gear, wherein the second element of the respective planetary gearsets is formed by a web in the case of a minus planetary gearset and in the case of a plus planetary gearset by a ring gear, wherein the third element of the respective planetary gearsets is formed by the ring gear in the case of a minus planetary gearset and in the case of a plus planetary gearset by the web, wherein a first, a second, a third, a fourth, a fifth and a sixth shift element are provided, wherein by selective actuation of four of the shift elements different paths of the flow of power can be established on the planetary gearsets by achieving different gears between the transmission input and transmission output, wherein the first element of the first planetary gearset and the first element of the second planetary gearset are rotatably engaged with each other and can be jointly fixed to a non-rotating component via the first shift element, at which the third element of the first planetary gearset can also be fixed by means of the second shift element, wherein the second element of the first planetary gearset and the third element of the fourth planetary gearset are rotatably engaged with each other, wherein the transmission input is rotatably engaged with the second element of the second planetary gearset, whereas the transmission output is rotatably engaged with the second element of the fourth planetary gearset.

BACKGROUND OF THE INVENTION

In this case, transmission refers to a multi-speed transmission, i.e. there are several different gear ratios that can be achieved as gears between the transmission input and the transmission output of the transmission by actuation of corresponding shift elements, which is preferably done automatically. Depending on the arrangement of the shift elements, these are clutches or brakes. Such transmissions are mainly used in motor vehicles to suitably apply traction power supplied by a prime mover of the motor vehicle with regard to various criteria.

U.S. Pat. No. 8,545,362 B1 discloses a transmission, which comprises four planetary gearsets, each of which comprises a plurality of elements in the form of one sun gear, one planetary carrier and one ring gear. In addition, six shift elements are provided, through the selective actuation of which different gears can be established between a transmission input and a transmission output of the transmission. Overall, ten forward gears, and one reverse gear can be achieved between the transmission input and the transmission output.

SUMMARY OF THE INVENTION

The object of the present invention is to provide an alternative embodiment to the transmission known from the prior art having ten forward gears and one reverse gear between a transmission input and a transmission output.

This object is achieved based on the preamble of the independent claim(s) in conjunction with its characterizing features. The subsequent dependent claims each describe advantageous developments of the invention. A drive train of a motor vehicle, in which a transmission according to the invention is used, is the subject matter of an additional independent claim.

According to the invention, a transmission comprises a transmission input and a transmission output, and a first, a second, a third and a fourth planetary gearset. The planetary gearsets each comprise a plurality of elements and are used to guide a flow of power from the transmission input to the transmission output. Further, six shift elements are provided, wherein by selective actuation of four of the shift elements different paths of the flow of power can be established using the planetary gearsets by achieving different gears between transmission input and transmission output.

For the purposes of the invention, the transmission input is preferably formed at one end of a drive shaft, which can be used to transfer drive motion into the transmission. In the context of the invention, the transmission output can be defined at the end of an output shaft, which is used to route the ratio-related drive motion out of the transmission in accordance with the established gear. The transmission output can also be formed by the toothing of a gear, at which the ratio-related drive motion can be picked up.

In the context of the invention, "shaft" denotes a rotatable component of the transmission, which is used to interconnect assigned components of the transmission axially and/or radially rotatably engaged or which is used to establish such a connection upon actuation of a suitable shift element. Thus, the relevant shaft can also be an interface, which is used to connect a component, for instance, radially to the transmission output.

In the context of the invention, "axial" denotes an orientation in the direction of a transmission input axis, along which the planetary gearsets are arranged coaxially to each other. The term "radial" then denotes an orientation in the diametrical direction of a shaft in line with the transmission input axis.

The planetary gearsets can each be designed either as a minus planetary gearset or as a plus planetary gearset, the connection of the elements permitting. In the case of a minus planetary gearset, the first element of the planetary gearset is a sun gear, the second element of the planetary gearset is a planetary carrier and the third element of the planetary gearset is a ring gear. A minus planetary set is thus composed of the elements sun gear, planetary carrier and ring gear in a manner known in principle to the person skilled in the art, wherein the planetary carrier has at least one, but preferably a plurality of planetary gears, which individually each mesh with both the sun gear and the surrounding ring gear.

By contrast, in the case of a positive planetary gearset, the first element of the planetary gearset is a sun gear, the second element of the planetary gearset is a ring gear and the third element of the planetary gearset is a planetary carrier. In a plus-planetary gearset the elements sun gear, ring gear and planetary carrier are also present, wherein the latter has at least one pair of planetary gears, in which one planetary gearset meshes with the inner sun gear and the other planetary gearset meshes with the surrounding ring gear, and the planetary gears mesh with each other.

The planetary gearsets are preferably arranged in the axial direction in the order of the first planetary gearset, the second planetary gearset, the third planetary gearset, and the fourth planetary gearset. In principle, however, another arrangement could also be made within the scope of the invention.

In the transmission according to the invention, the first element of the first planetary gearset and the first element of the second planetary gearset are rotatably engaged with each other and can be jointly fixed to a non-rotating component via the first shift element, at which the third element of the first planetary gearset can also be fixed by means of the second shift element. Furthermore, the second element of the first planetary gearset and the third element of the fourth planetary gearset are rotatably engaged with each other. The transmission input is rotatably engaged with the second element of the second planetary gearset, whereas the transmission output is rotatably engaged with the second element of the fourth planetary gearset.

The non-rotating elements of the transmission according to the invention are permanently stationary components of the transmission, preferably a transmission housing or a part of such a transmission housing or a component, which is permanently connected to the transmission housing. By fixing the first element of the first planetary gearset and the first element of the second planetary gearset to a non-rotating component, as a consequence, both elements are prevented from rotating upon actuation of the first shift element.

The same applies in the case of the third element of the second planetary gearset when the second shift element is closed.

The invention now comprises the technical teaching that the second element of the first planetary gearset and the third element of the fourth planetary gearset can be jointly connected to the third element of the second planetary gearset via the third shift element.

In other words, in the transmission according to the invention, therefore, the first element of the first planetary gearset and the first element of the second planetary gearset are permanently rotatably engaged with each other. Likewise, the second element of the first planetary gearset and the third element of the fourth planetary gearset are permanently rotatably engaged with each other. In addition, the transmission input is rotatably engaged with the second element of the second planetary gearset, whereas the transmission output and the second element of the fourth planetary gearset are rotatably engaged with each other.

Upon actuation of the first shift element, the first element of the first planetary gearset and the first element of the second planetary gearset are jointly fixed to a non-rotating component, with which the third element of the first planetary gearset is also non-rotatably engaged upon closing of the second shift element, and thus stopped. In contrast, actuation of the third shift element results in a rotatably engaged connection of the third element of the second planetary gearset to the second element of the first planetary gearset and the third element of the fourth planetary gearset.

Consequently, the first and the second shift elements are designed as brakes that brake the rotatable component or the rotatably engaged, rotatable components of the transmission to a standstill and fix them to a non-rotating component, whereas the third shift element is a coupling, which upon actuation aligns the rotary motions of rotatable components of the transmission.

Preferably, the first shift element is provided axially on an end facing the transmission input of the first planetary gearset and radially surrounding it, whereas the second shift element is located in particular in the wheel plane of the first planetary gearset and thus axially basically at the same height as the first planetary gearset if the first planetary gearset is a minus planetary gearset. On the other hand, if the first planetary gearset is designed as a positive planetary gearset, the second shift element preferably is also located axially on the end of the first planetary gearset facing the gearbox input. More preferably, the first and the second shift elements are placed axially adjacent each other, i.e. a supply via a joint supply line is feasible due to this arrangement. In contrast, the third shift element is placed axially in particular between the second and the third planetary gears.

A rotatably engaged connection of the rotatable elements of the planetary gearsets according to the invention is preferably implemented by one or more intermediate shafts, which can be short axial and/or radial intermediate pieces for a close proximity of the elements. Specifically, the permanently rotatably engaged elements of the planetary gearsets can each be either rotatably engaged individual components or integral pieces. In the second case, the respective elements and the optionally existing shaft are then formed by a joint component, wherein this is implemented in particular when the respective elements in the transmission are in close proximity to each other.

For elements of the planetary gearsets, which are only rotatably engaged upon the actuation of respective shift elements, a connection via one or more intermediate shafts is implemented as well.

Overall, a transmission in accordance with the invention is characterized by a compact design, low component loads, good gearing efficiency and low transmission losses.

According to one embodiment of the invention, the third element of the third planetary gearset can be rotatably engaged with a shaft by means of the fourth shift element, which shaft can also be rotatably engaged with the third element of the second planetary gearset via the fifth shift element on the one hand, and on the other hand, by means of the sixth shift element rotatably engaged with the first element of the third planetary gearset and the first element of the fourth planetary gearset. Furthermore, the second element of the third planetary gearset is rotatably engaged with the transmission input.

In this case, the transmission input is also permanently rotatably engaged with the second element of the third planetary gearset besides the second element of the second planetary gearset. Further, a free shaft is provided, which is rotatably engaged with the third element of the third planetary gearset by closing the fourth shift element, rotatably fixed with the third element of the second planetary gearset by actuating the fifth shift element, and rotatably fixed with the first element of the third planetary gearset by closing the sixth shift element and rotatably fixed with the first element of the fourth planetary gearset. The first element of the third planetary gearset and the first element of the fourth planetary gearset are permanently rotatably engaged with each other.

The fourth, the fifth and the sixth shift elements are each designed as clutches, which, when actuated, align the rotary motions of the respective associated, rotatable components of the transmission. In this case, the fourth and the fifth shift elements are preferably located axially between the second and the third planetary gearsets and are furthermore preferably placed axially directly next to one another at basically the same radial height. In particular, the third, the fourth and the fifth shift elements are axially adjacent to each other, wherein the fifth shift element is provided axially between the third and the fourth shift elements. In contrast, the sixth shift element is preferably placed axially between the third and the fourth planetary gearsets and is located radially in particular basically at the height of the fourth and the fifth shift elements.

According to an alternative embodiment of the invention, the second element of the third planetary gearset can be rotatably fixed with the transmission input by means of the fourth shift element, whereas the first element of the third planetary gearset is rotatably fixed with the first element of the fourth planetary gearset. Further, the third element of the third planetary gearset can be rotatably fixed with the third element of the second planetary gearset via the fifth shift element, whereas the third planetary gearset can be fixed by means of the sixth shift element.

In this variant, therefore, the transmission input can be non-rotatably fixed with the second element of the third planetary gearset upon actuation of the fourth shift element, whereas the third element of the third planetary gearset can be rotatably fixed with the third element of the second planetary gearset by closing the fifth shift element. The first element of the third planetary gearset and the first element of the fourth planetary gearset are in turn rotatably fixed. Finally, the third planetary gearset can be fixed by closing the sixth shift element.

Specifically, the blocking of the third planetary gearset is achieved by the sixth shift element rotatably fixing the third element with the first element of the third planetary gearset or the first element with the second element of the third planetary gearset or the second element with the third element of the planetary gearset when actuated. In all three cases, the result is the third planetary gearset being fixed.

In this case, the fourth, the fifth and the sixth shift elements are each designed as clutches which, when actuated, align the rotary motions of the respective associated, rotatable components of the transmission. In this case, the fourth and the fifth shift elements are located axially between the second and the third planetary gearset together with the third shift element, whereas the sixth shift element is in turn is provided axially between the third and fourth planetary gearsets. More preferably, the third, the fourth and the fifth shift elements are placed axially directly next to each other, wherein the fourth shift element is arranged radially inwards of the fifth shift element. In this case, therefore, a common supply of the shift elements would be feasible.

According to a further alternative embodiment of the invention, the second element of the third planetary gearset can be rotatably fixed with the transmission input by means of the fourth shift element, whereas the third element of the third planetary gearset is rotatably fixed with the third element of the second planetary gearset. Furthermore, the first element of the third planetary gearset can be rotatably fixed with the first element of the fourth planetary gearset via the fifth shift element, which can also be rotatably fixed with the second element of the third planetary gearset by means of the sixth shift element.

In this case, therefore, the transmission input can be rotatably fixed with the second element of the third planetary gearset via the fourth shift element and the former can also be rotatably fixed with the first element of the fourth planetary gearset by actuation of the sixth shift element. Apart from that, the first element of the fourth planetary gearset can still be rotatably fixed with the first element of the third planetary gearset by closing the fifth shift element.

Here too, the fourth, the fifth and the sixth shift elements each have the form of clutches which, in the closed state, align the rotational speeds of the respective associated components of the transmission with respect to one another and subsequently couple them in a rotationally fixed manner. Whereas the fourth shift element is placed between the second and the third planetary gearsets, the fifth and the sixth shift elements are preferably located between the third and the fourth planetary gearsets. More preferably, the fifth and the sixth shift elements are nested in each other by placing the fifth shift element axially basically at the same axial height as the sixth shift element and radially inwards of the latter. By contrast, the fourth shift element is provided axially on an opposite end of the third planetary gearset and is located directly adjacent to the third planetary gearset.

According to a further alternative embodiment option of the invention, the second element of the third planetary gearset is rotatably fixed with the transmission input, whereas the first element of the third planetary gearset can be rotatably fixed with the first element of the fourth planetary gearset by means of the fourth shift element, which can be rotatably fixed with the third element of the third planetary gearset by the sixth shift element. Furthermore, the third element of the third planetary gearset can also be rotatably fixed with the third element of the second planetary gearset by means of the fifth shift element.

In this variant, therefore, the second element of the third planetary gearset and the second element of the second planetary gearset are permanently rotatably fixed with the transmission input. In contrast, the third element of the third planetary gearset can be rotatably fixed with the third element of the second planetary gearset via the fifth shift element, and be rotatably fixed with the first element of the fourth planetary gearset by means of the sixth shift element. The first element of the fourth planetary gearset can then still be rotatably fixed with the first element of the third planetary gearset by closing the fourth shift element.

Once again, the fourth, the fifth and the sixth shift elements have the form of clutches, which, when actuated, align the rotational motions of the respective associated components of the transmission and subsequently couple them in a rotatably fixed manner. Whereas the fifth shift element is provided in particular axially between the second and the third planetary gearsets and more preferably axially immediately adjacent to the third shift element, the fourth and the sixth shift elements are located axially in particular between the third and the fourth planetary gearsets. More preferably, the fourth and the sixth shift elements are nested in each other by placing the fourth and the sixth shift elements axially basically at the same height and placing the fourth shift element radially inwards of the sixth shift element. In this respect, a joint supply of the third and fifth shift elements and/or the fourth and the sixth shift elements is conceivable in this variant.

In all the above variants of a transmission according to the invention, ten forward gears, and one reverse gear can be implemented by selectively closing four shift elements each. To this end, a first forward gear is achieved by actuating the first, the second, the fourth and the sixth shift elements, whereas a second forward gear is formed by closing the first, the second, the fifth and the sixth shift elements. Further, a third forward gear is obtained by actuating the second, fourth, fifth and sixth shift elements, whereas a fourth forward gear can be achieved by actuating the second, third, fifth and sixth shift elements. Further, a fifth forward gear can be established by closing the second, the third, the fourth and the sixth shift elements, wherein for implementing a sixth forward gear, the second, the third, the fourth and the fifth shift elements are to be actuated. On the other hand, a seventh forward gear is obtained by actuating the third, fourth, fifth and sixth shift elements, whereas an eighth forward gear can be achieved by actuating the first, third, fourth and fifth shift elements. A ninth forward gear may be achieved by actuating the first, third, fourth and sixth shift elements, whereas for achieving the tenth forward gear, the first, third, fifth and sixth shift elements are to be closed. On the other hand, the reverse gear is obtained by actuating the first, the second, the fourth and the fifth shift element.

With a suitable choice of stationary gear ratios of the planetary gearsets, a transmission range suitable for use in the area of a motor vehicle is thereby realized. For sequentially achieving the forward gears according to their order, the state of two shift elements each always has to be varied, by opening one of the shift elements involved in the previous forward gear and closing another shift element to establish the subsequent forward gear. This then has the consequence that a change between the gears can be executed very quickly. In addition, because four of the total of six shift elements are closed in every gear, losses due to opened shift elements can be kept low.

Advantageously, in the transmission according to the invention, a reverse gear for a drive can be implemented via the drive motor upstream of the transmission. This can be implemented as an alternative or in addition to an arrangement of an electric machine in the transmission to still be able to implement reverse driving of the motor vehicle in the event of a failure of the electric machine.

In a further development of the invention, the planetary gearsets are designed as minus planetary gearsets. According to an alternative embodiment of the invention, however, the first planetary gearset is designed as a plus-planetary gearset, whereas the second, the third and the fourth planetary gearsets are each minus planetary gearsets.

A connection of the individual elements permitting, a minus planetary gearset in comparison to the above can be converted into a plus-planetary gearset, wherein then compared to the version as a minus planetary gearset, the connections of the ring gear and the planetary carrier have to be interchanged and a relevant stationary gear ratio has to be increased by one. Conversely, a plus planetary gearset could be replaced by a minus planetary gearset, if the connection of the elements of the transmission makes this possible. In this case, compared to the plus planetary gearset, the ring gear and the planetary carrier connection would then also have to be interchanged and a relevant stationary gear ratio has to be reduced by one. As mentioned above, however, all planetary gearsets are preferably designed as minus planetary gearsets or, alternatively, only the second, the third and the fourth planetary gearsets are implemented as minus planetary gearsets, whereas in particular the first planetary gearset is a plus planetary gearset.

In a further development of the invention, the transmission input is formed on a drive shaft and the transmission output is formed on an output shaft, wherein the drive shaft and the output shaft are coaxial to each other. For this purpose, the transmission input is preferably provided at an axial end of the transmission, whereas the transmission output is configured axially at an opposite end of the transmission. This type of arrangement is particularly suitable for use in a motor vehicle having a drive train aligned in the direction of travel of the motor vehicle. Alternatively, the transmission output can also be aligned transversely to the transmission input to implement a setup suitable for a drive train that is transversely oriented to the direction of travel of the motor vehicle. In this case, the transmission output may be formed by gearing, which meshes with gearing of a transmission axis arranged in parallel to the axis of the shaft. The rear or front differential of a drive axle can then be arranged on this shaft.

According to a further embodiment of the invention, one or more shift elements are each implemented as non-positive shift elements. Non-positive shift elements have the advantage of being achieved under load, i.e. a change of gears can be executed without interruption of traction. But particularly preferably, the second shift element is designed as a form-locking shift element, such as a dog clutch or a synchronizer unit. Because the second shift element is involved in establishing the first to sixth forward gears, so that it is only opened in the course of successive upshifting. A form-fitting shift element has the advantage over a non-positive shift element that only slight drag torques occur in the opened state, i.e. a higher efficiency can be attained.

In a further development of the invention, an electric machine is provided, the rotor of which is rotatably engaged with one of the rotatable components of the transmission. Preferably, a stator of the electric machine is then rotatably engaged with a non-rotating component of the transmission, wherein the electric machine in this case can be operated as an electric motor and/or a generator to implement different functions. In particular, the electric machine can be used to perform in charge depleting mode, as a power via the electric machine, in deceleration and recuperation mode and/or for synchronization in the transmission. The rotor of the electric machine can be arranged coaxially to the relevant component or can be arranged offset in the axial direction, wherein in the latter case a coupling can be implemented via one or more intermediate transmission stages, for instance in the form of spur gears, or a belt drive, such as a chain drive.

Preferably, however, the rotor of the electric machine is rotatably coupled with the transmission input, thereby establishing a pure electrical driving mode of the motor vehicle in a suitable manner. More preferably, one or more of the shift elements are used as internal starting elements for electric driving, for which in particular the first shift element, the second shift element or the fourth shift element are suitable because they are involved in both the first two forward gears and the reverse gear. As a further alternative, however, a separate starting clutch can be used, which is positioned between the electric machine and the transmission gearset.

In pure electrical drive mode, one of the gears is achieved in the transmission, wherein in the forward gears a reverse drive of the motor vehicle can be implemented by the electric machine initiating a reverse rotary motion, thereby the reverse travel of the motor vehicle is attained in the gear ratio of the achieved forward gear. As a result, the gear ratios of the forward gears can be used for both the electric forward travel and the electric reverse travel. The rotor of the electric machine could, apart from the transmission input, also be connected to one of the other, rotatable components of the transmission.

According to a further embodiment of the invention, which is implemented in particular in combination with the aforementioned arrangement of an electric machine, a clutch is also provided, which can be used to rotatably engage the transmission input with a connecting shaft. The connecting shaft is then used to connect to the drive machine as part of a drive train of a motor vehicle. The provision of the clutch has the advantage that for pure electric drive, a connection to the drive machine can be interrupted, to prevent it from being entrained. The clutch is preferably designed as a non-positive shift element, such as a multi-disc clutch, but may also be a positive shift element, such as a dog clutch or synchronizer unit.

In general, a starting element can be installed upstream of the transmission, for instance a hydrodynamic torque converter or a friction clutch. This starting element can then also be part of the transmission and is used to design a starting process by permitting a slip speed between the internal combustion engine and the transmission input of the transmission. In this case, one of the shift elements of the transmission or the possibly existing clutch can be designed as such a starting element in the form of a friction shift element. In addition, in principle a freewheel to the transmission housing or to another shaft can be arranged on every shaft of the transmission.

The transmission according to the invention is in particular part of a drive train of a motor vehicle and is arranged between a drive motor of the motor vehicle designed in particular as an internal combustion engine and further components of the drive train arranged downstream in the direction of flow of power to the drive wheels of the motor vehicle. In that case, the transmission input of the transmission is either permanently rotatably engaged with a crankshaft of the internal combustion engine or can be connected to the latter via an interposed clutch or a starting element, wherein a torsional vibration damper can also be provided between the engine and transmission. On the output end, the transmission within the drive train of a motor vehicle is then preferably coupled to an axle gearing of a drive axle of the motor vehicle, although there may also be a connection to a longitudinal differential, which can be used for a distribution to a plurality of driven axles of the motor vehicle. The axle or the longitudinal differential and the transmission can be arranged in a joint housing. Likewise, a torsional vibration damper can also be integrated into this housing.

The fact that two components of the transmission are "rotatably fixed with each other" or "coupled" or "interconnected" denotes in terms of the invention a permanent connection of these components, i.e. they cannot rotate independently of each other. In this respect, no shift element is provided between these components, which may be elements of the planetary gearsets or shafts or a non-rotating component of the transmission, but the corresponding components are rigidly coupled to each other.

However, if a shift element is provided between two components of the transmission, then these components are not permanently rotatably fixed with each other, but a coupling for co-rotation is performed only by actuating the intermediate shift element. In this case, actuation of the shift element in the sense of the invention means that the relevant shift element is changed into a closed state and, as a consequence, aligns the rotational motions of components directly coupled thereto. In the case of an embodiment of the relevant shift element as a form-locking shift element, the directly rotatably fixed components are running at the same speed, whereas in the case of a non-positive shift element, speed differences between the components can exist even after it has been actuated. This intentional or unwanted state is still referred to as a rotatably engaged connection of the respective components via the shift element in the context of the invention.

The invention is not limited to the specified combination of the features of the main claim or the dependent claims. There are also options to combine individual features, even if they arise from the claims, from the following description of preferred embodiments of the invention or directly from the drawings. Any references in the claims to the drawings by use of reference numerals are not intended to limit the scope of the claims.

BRIEF DESCRIPTION OF THE DRAWINGS

Advantageous embodiments of the invention, which are explained below, are shown in the drawings. In the drawings:

FIG. 16 shows an exemplary circuit diagram of the transmissions of FIGS. 2 to 15.

DETAILED DESCRIPTION OF THE PREFERRED EMBODIMENTS

Figure 1:
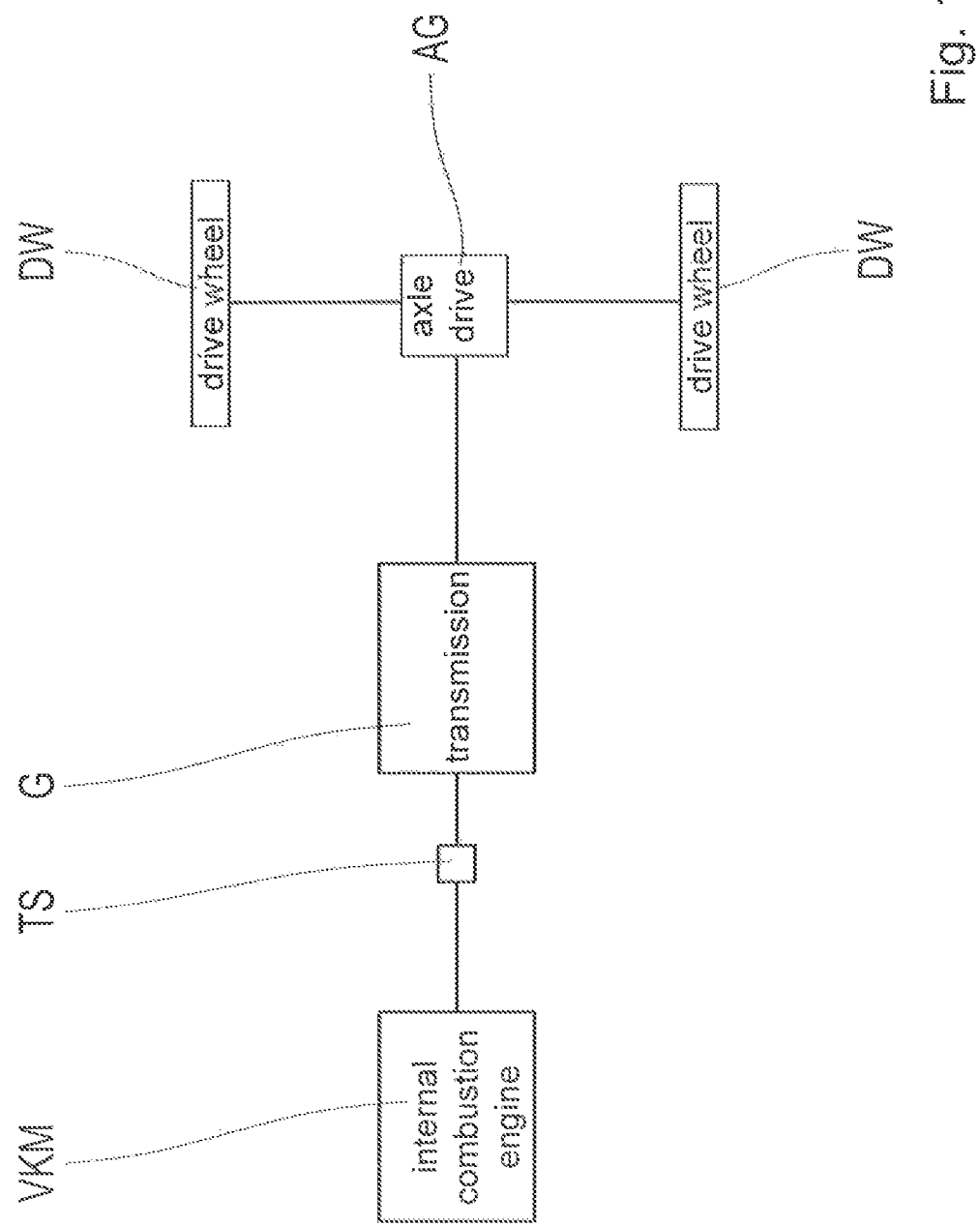
FIG. 1 shows a schematic view of a drive train of a motor vehicle, in which a transmission according to the invention is used.

FIG. 1 shows a schematic view of a drive train of a motor vehicle, in which an internal combustion engine VKM is connected to a transmission G via an intermediate torsional vibration damper TS. On the output end, an axle drive AG is downstream of the transmission G, which axle drive is used to distribute drive power to the drive wheels DW of a drive axle of the motor vehicle. The transmission G and the axle drive AG can be combined in a joint transmission housing, in which then the torsional vibration damper TS can be integrated as well. As can also be seen in FIG. 1, the internal combustion engine VKM, the torsional vibration damper TS, the transmission G and the axle drive AG are oriented in the direction of travel of the motor vehicle.

Figure 2:
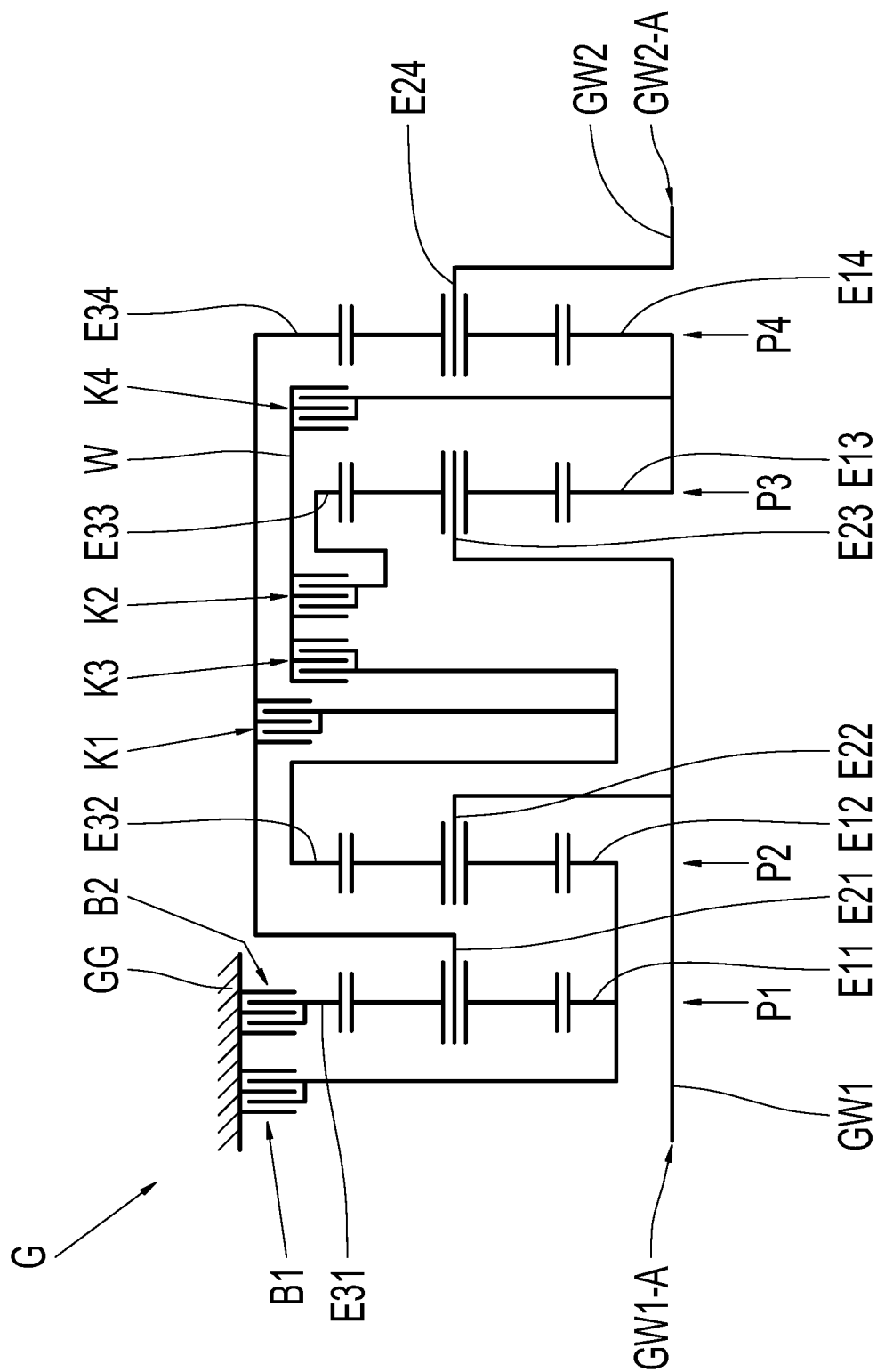
FIG. 2 shows a schematic view of a transmission according to a first embodiment of the invention.

FIG. 2 shows a schematic representation of the transmission G according to a first embodiment of the invention. As can be seen, the transmission G comprises a first planetary gearset P1, a second planetary gearset P2, a third planetary gearset P3 and a fourth planetary gearset P4. Each of the planetary gearsets P1, P2, P3 and P4 has a first element E11 or E12 or E13 or E14, a second element E21 or E22 or E23 or E24 and a third element E31 or E32 or E33 or E34. The first element E11 or E12 or E13 or E14 is always formed as a sun gear of the respective planetary gearset P1 or P2 or P3 or P4, whereas the respective second element E21 or E22 or E23 or E24 is a planetary carrier. The remaining third element E31 or E32 or E33 or E34 is then formed as a ring gear in the planetary gearsets P1, P2, P3, P4.

The planetary gearsets P1, P2, P3 and P4 are thus each designed as minus planetary gearsets, in which one, but preferably several planetary gears are rotatably mounted on the planetary carrier, which planetary gears mesh with the radially inner sun gear and also with the surrounding ring gear.

Wherever the connection permits, however, one or more of the planetary gearsets P1, P2, P3 and P4 could be designed as plus planetary gearsets. Compared to an embodiment as a minus planetary gearset, the second element E21 or E22 or E23 or E24 would then have to be formed by the ring gear and the third element E31 or E32 or E33 or E34 would then have to be formed by the planetary carrier for the change into a plus planetary gearset and a relevant stationary gear ratio would have to be increased by one. In the case of a plus planetary gearset, the planetary carrier then carries at least one pair of planetary gears whose planet gears mesh with the radially inner sun gear and one planet gear meshes with the radially surrounding ring gear, and the planetary gears of the pair of planetary gears mesh with each other.

In this case, the first planetary gearset P1, the second planetary gearset P2, the third planetary gearset P3 and the fourth planetary gearset P4 are arranged axially between a transmission input GW1-A and a transmission output GW2-A in the order first planetary gearset P1, second planetary gearset P2, third planetary gearset P3 and fourth planetary gearset P4.

The transmission input GW1-A and the transmission output GW2-A are provided coaxially to each other at opposite axial ends of the transmission G.

The transmission input GW1-A is used in the drive train of a motor vehicle of FIG. 1 as a connection to the internal combustion engine VKM, whereas the transmission G is connected to the downstream axle drive AG at the transmission output GW2-A.

As can be seen in FIG. 2, the transmission G comprises a total of six shift elements in the form of a first shift element B1, a second shift element B2, a third shift element K1, a fourth shift element K2, a fifth shift element K3 and a sixth shift element K4. In this case, the shift elements B1, B2, K1, K2, K3 and K4 are each designed as non-positive shift elements and are preferably multi-disk shift elements. In addition, the third shift element K1, the fourth shift element K2, the fifth shift element K3 and the sixth shift element K4 are designed as clutches in this case, whereas the first shift element B1 and the second shift element B2 are brakes.

In this case, the first element E11 of the first planetary gearset P1 and the first element E12 of the second planetary gearset P2 are rotatably fixed with each other and can be jointly fixed via the first shift element B1 to a non-rotating component GG, which is preferably a transmission housing of the transmission G or is part of such a transmission housing. In addition, the third element E31 of the first planetary gearset P1 can be fixed to a non-rotating component GG by closing the second shift element B2. In contrast, the second element E21 of the first planetary gearset P1 is rotatably fixed with the third element E34 of the fourth planetary gearset P4.

As can further be seen in FIG. 2, the second element E22 of the second planetary gearset P2 and the second element E23 of the third planetary gearset P3 are jointly rotatably fixed with a drive shaft GW1, which forms the transmission input GW1-A at one axial end. The third element E32 of the second planetary gearset P2 can, on the one hand, be rotatably fixed with the second element E21 of the first planetary gearset P1 and with the third element E34 of the fourth planetary gearset P4 via the third shift element K1, and, on the other hand, can be rotatably engaged with a shaft W by means of the fifth shift element K3.

The shaft W is provided as a free shaft in the transmission G and can, apart from the connectability to the third element E32 of the second planetary gearset P2, also be rotatably fixed with the third element E33 of the third planetary gearset P3 via the fourth shift element K2 and by means of the sixth shift element K4 rotatably engage with the first element E13 of the third planetary gearset P3 and the first element E14 of the fourth planetary gearset P4. The first element E13 of the third planetary gearset P3 and the first element E14 of the fourth planetary gearset P4 are permanently rotatably fixed with each other. Finally, the second element E24 of the fourth planetary gearset P4 is permanently rotatably fixed with an output shaft GW2, which defines the transmission output GW2-A at one axial end.

The first shift element B1 is located axially on a side of the first planetary gearset P1 facing the transmission input GW 1-A, whereas the second shift element B2 is located in the wheel plane of the first planetary gearset P1. In this respect, the second shift element B2 is placed axially substantially at the level of the first planetary gearset P1 and radially surrounding it.

The third shift element K1, the fourth shift element K2 and the fifth shift element K3 are located axially between the second planetary gearset P2 and the third planetary gearset P3, wherein the shift elements K1, K2 and K3 are axially provided directly adjacent to each other. In addition, the fourth shift element K4 and the fifth shift element K3 are located radially substantially at the same height and are offset radially inwards relative to the third shift element K1. Due to this spatial arrangement of the shift elements K1, K2 and K3, they can be jointly supplied via a joint supply line. In contrast, the sixth shift element K4 is located axially between the third planetary gearset P3 and the fourth planetary gearset P4, wherein the former is arranged radially basically at the level of the fourth shift element K2 and the fifth shift element K3.

Figure 3:
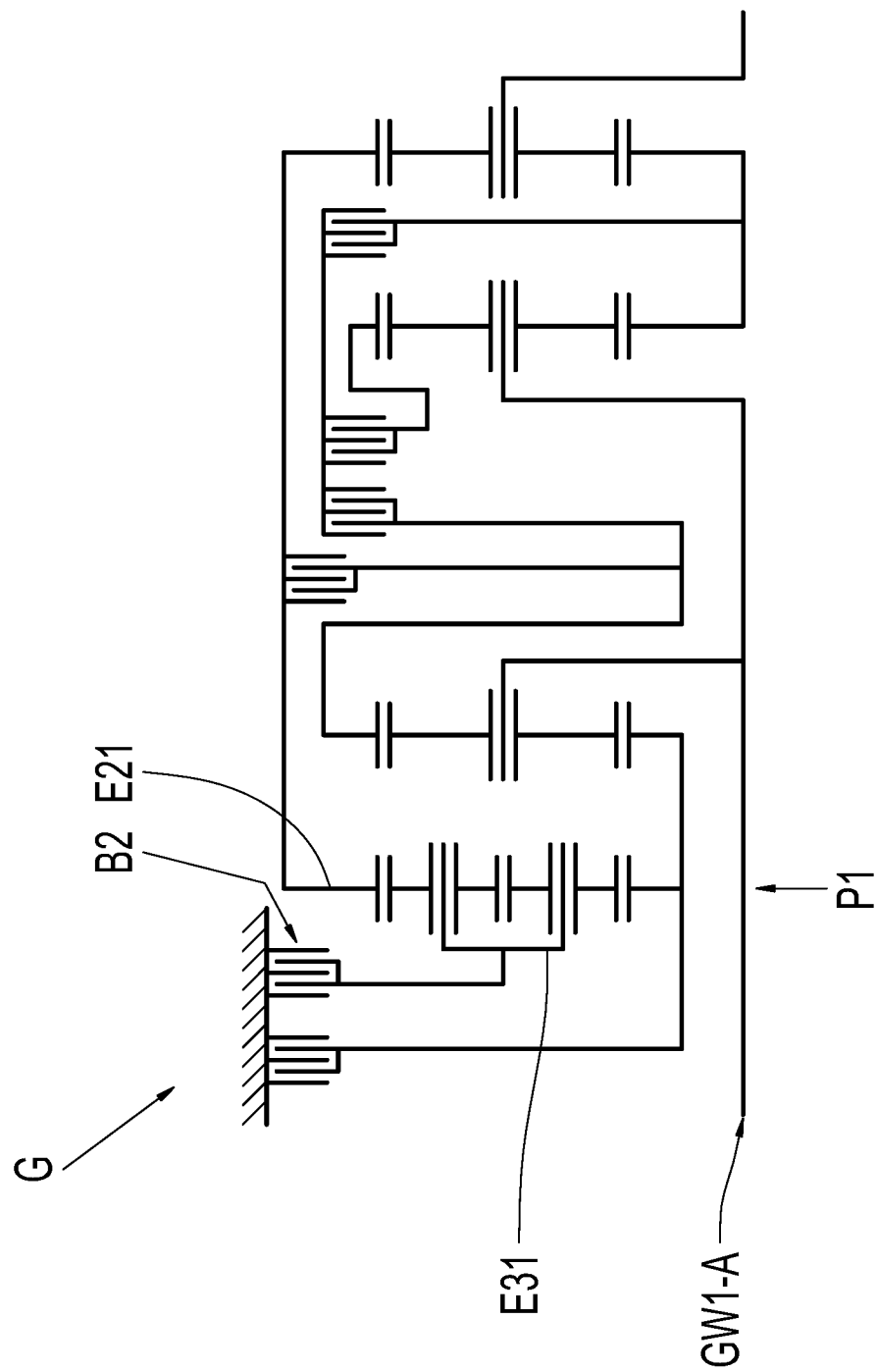
FIG. 3 shows a schematic representation of a transmission according to a second embodiment option of the invention.

FIG. 3 shows a schematic view of a transmission G according to a second embodiment option of the invention, which basically corresponds to the variant shown in FIG. 2. In contrast to the variant according to FIG. 2, in this case, however, the first planetary gearset P1 is designed as a plus planetary gearset, in which the third element E31 is formed by the planetary carrier and the second element E21 is formed by the ring gear. The planetary carrier has at least one pair of planetary gears, and of those planetary gears one planetary gearset meshes with the radially inner sun gear and the other planetary gearset meshes with the radially surrounding ring gear, and the planetary gears mesh with each other. As a further difference, the second shift element B2 is now arranged axially on a side of the first planetary gearset P1 facing the transmission input GW 1-A. Otherwise, the embodiment according to FIG. 3 corresponds to the variant according to FIG. 2, i.e. reference is made to the description thereof.

Figure 4:
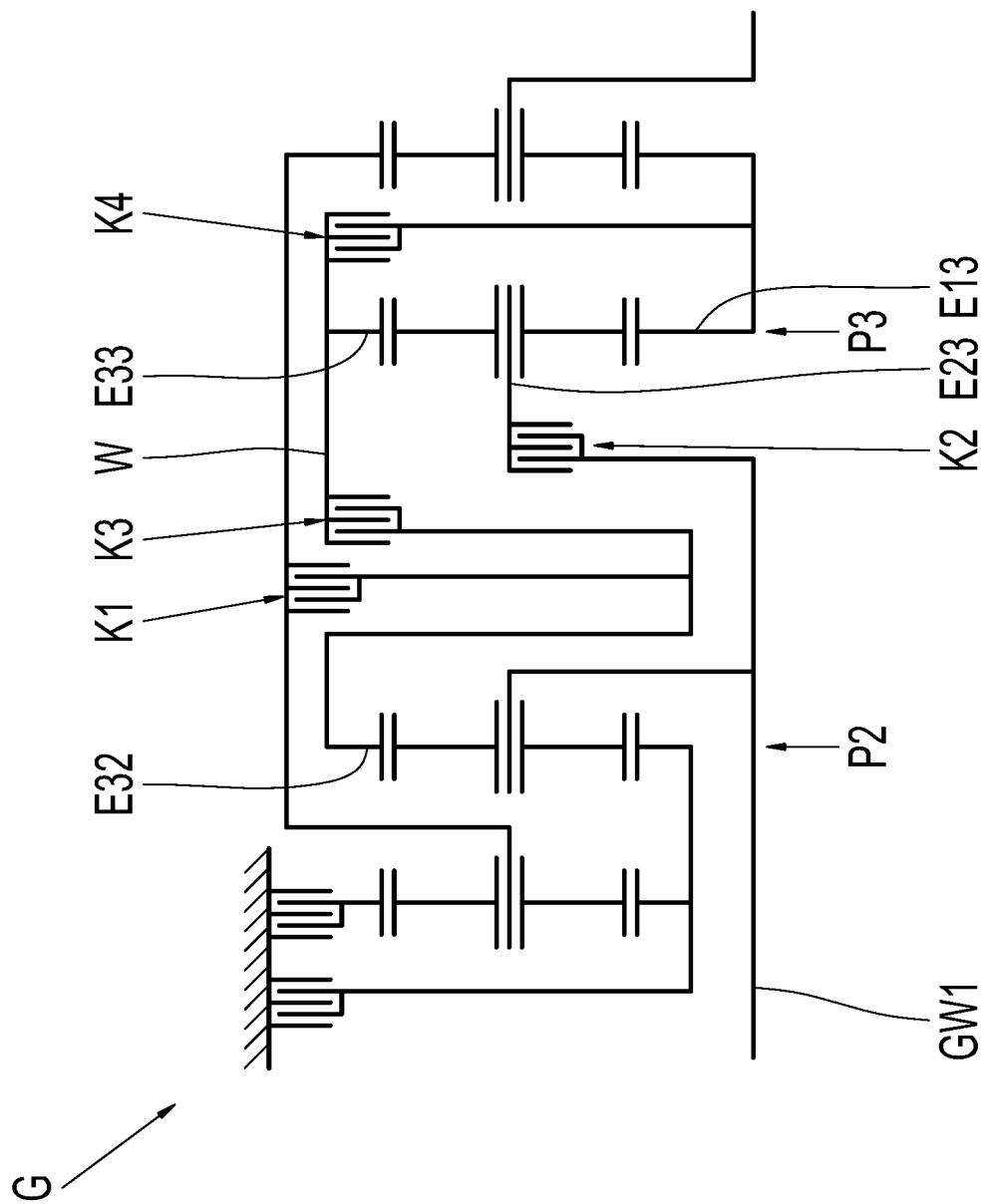
FIG. 4 shows a schematic view of a transmission according to a third embodiment of the invention.

Furthermore, a transmission G according to a third embodiment of the invention is shown in FIG. 4, which largely corresponds to the variant of FIG. 2. In contrast, however, in this case the second element E23 of the third planetary gearset P3 is not permanently rotatably engaged with the drive shaft GW1, but now the fourth shift element K2 has to be closed for a rotatably engaged connection. Furthermore, the third element E33 of the third planetary gearset P3 is permanently rotatably engaged with the shaft W such that closing the fifth shift element K3 directly causes a rotatably fixed connection of the third element E33 of the third planetary gearset P3 to the third element E32 of the second planetary gearset P2. Finally, closing the sixth shift element K4 causes the third planetary gearset P3 to be fixed, in which case the third element E33 and the first element E13 of the third planetary gearset are rotatably fixed with each other. Although the fourth shift element K2 is still provided axially adjacent to the third shift element K1 and the fifth shift element K3, the fourth shift element K2 has now moved radially further inwards due to the altered function. Otherwise, the embodiment according to FIG. 4 corresponds to the variant according to FIG. 2. In this respect, reference is made to the description of FIG. 3.

Figure 5:
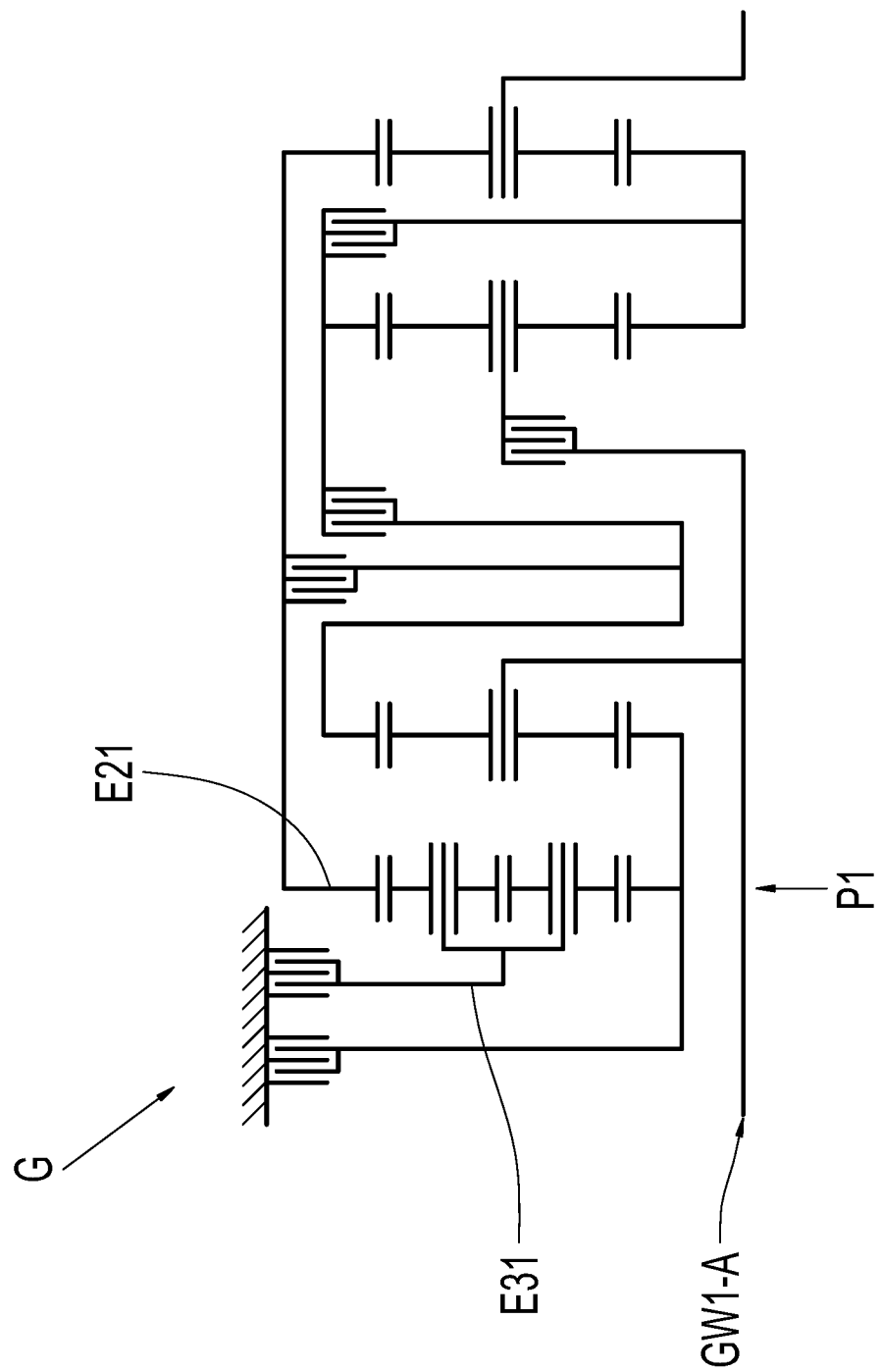
FIG. 5 shows a schematic representation of a transmission according to a fourth embodiment option of the invention.

FIG. 5 shows a schematic view of a transmission G according to a fourth embodiment of the invention, which basically corresponds to the previous variant shown in FIG. 4. In contrast to the variant according to FIG. 3, here the first planetary gearset P1 is once again designed as a plus planetary gearset, in which the third element E31 is the planetary carrier and the second element E21 is the ring gear. At least one pair of planetary gears is rotatably mounted in the planetary carrier, one planetary gear of this pair of planetary gears is engaged with the radially inner sun gear and the other planetary gear with the radially surrounding ring gear, and the planetary gears mesh with each other. In addition, the second shift element B2 is arranged axially on the transmission input GW1-A end facing the first planetary gearset P1. Otherwise, the embodiment according to FIG. 5 corresponds to the variant according to FIG. 4, i.e. reference is made to the description thereof.

Figure 6:
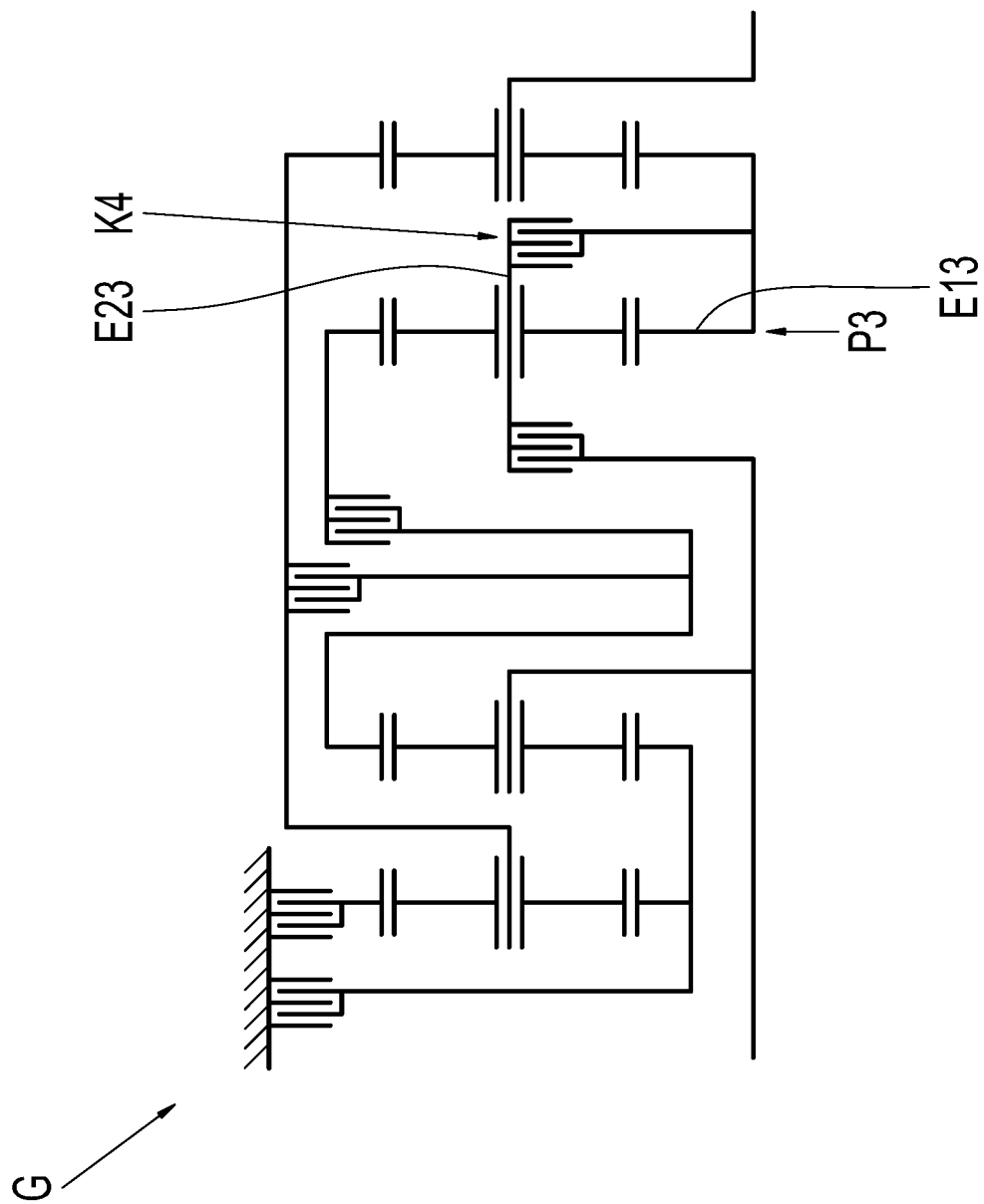
FIG. 6 shows a schematic view of a transmission according to a fifth embodiment of the invention.

Furthermore, a schematic representation of a transmission G according to a fifth embodiment of the invention is shown in FIG. 6, which largely corresponds to the variant according to FIG. 4. The only difference is that a blocking of the third planetary gearset P3 is implemented via the sixth shift element K4, by actuating the sixth shift element K4, the first element E13 of the third planetary gearset P3 is rotatably fixed to the second element E23 of the third planetary gearset P3. In this respect, then the radial position of the sixth shift element K4 has changed compared to the variant of FIG. 4, as it is now placed radially further inwards. Apart from that, the embodiment according to FIG. 6 corresponds to the variant according to FIG. 4, i.e. reference is made to the description thereof.

Figure 7:
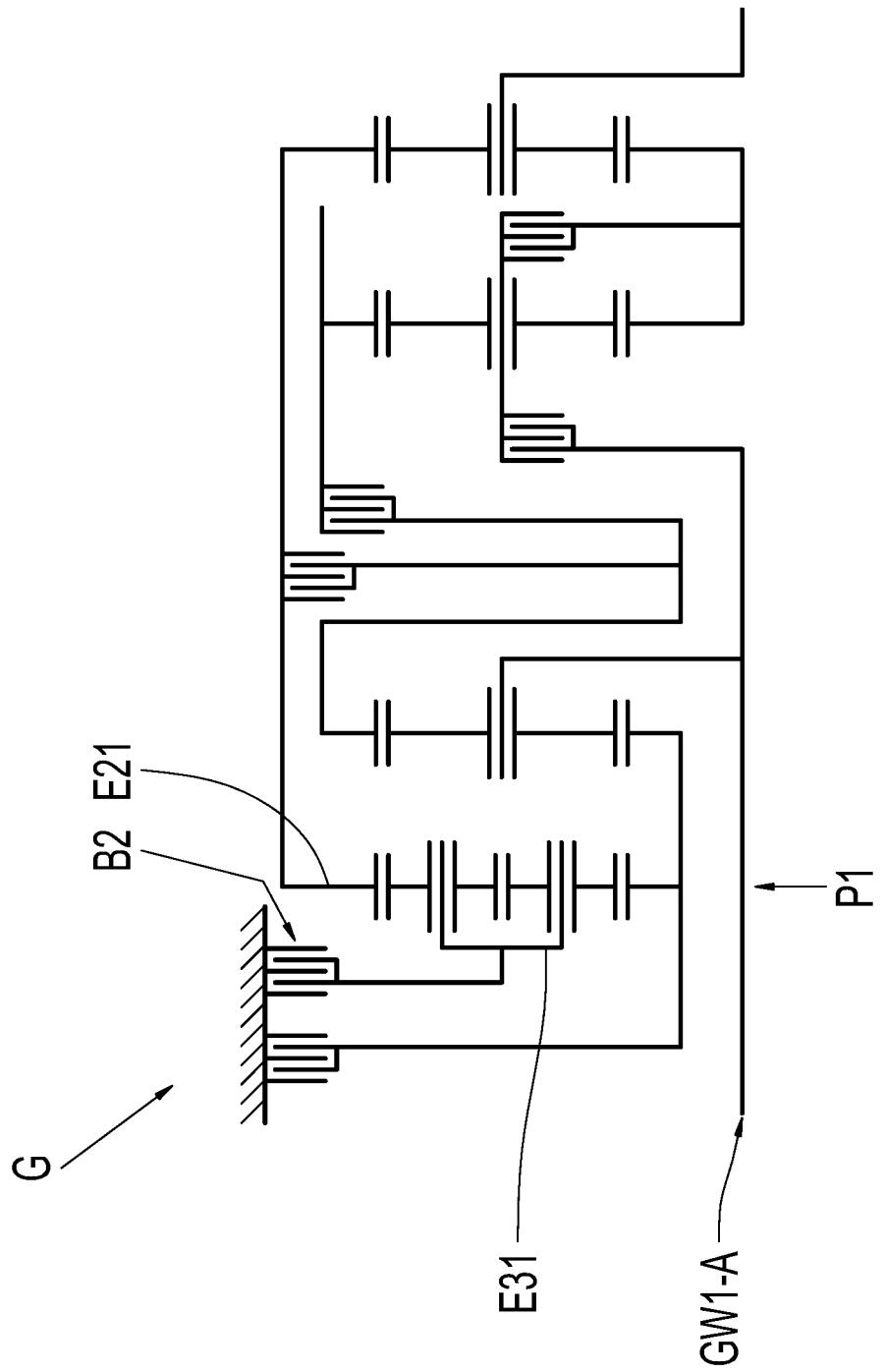
FIG. 7 shows a schematic representation of a transmission according to a sixth embodiment option of the invention.

FIG. 7 shows a schematic view of a transmission G according to a sixth embodiment option of the invention, which basically corresponds to the previous variant of FIG. 6. The difference is that the first planetary gearset P1 is again designed as a plus-planetary gearset, in which the third element E31 is formed by the planetary carrier and the second element E21 by the ring gear. The planetary carrier has at least one pair of planetary gears, and of those planetary gears one planetary gear meshes with the radially inner sun gear and the other planetary gear meshes with the radially surrounding ring gear, and the planetary gears mesh with each other. As a further difference, the second shift element B2 is now arranged axially on the side of the first planetary gearset P1 facing the transmission input GW1-A. Otherwise, the embodiment according to FIG. 7 corresponds to the variant according to FIG. 6, i.e. reference is made to the description thereof.

Figure 8:
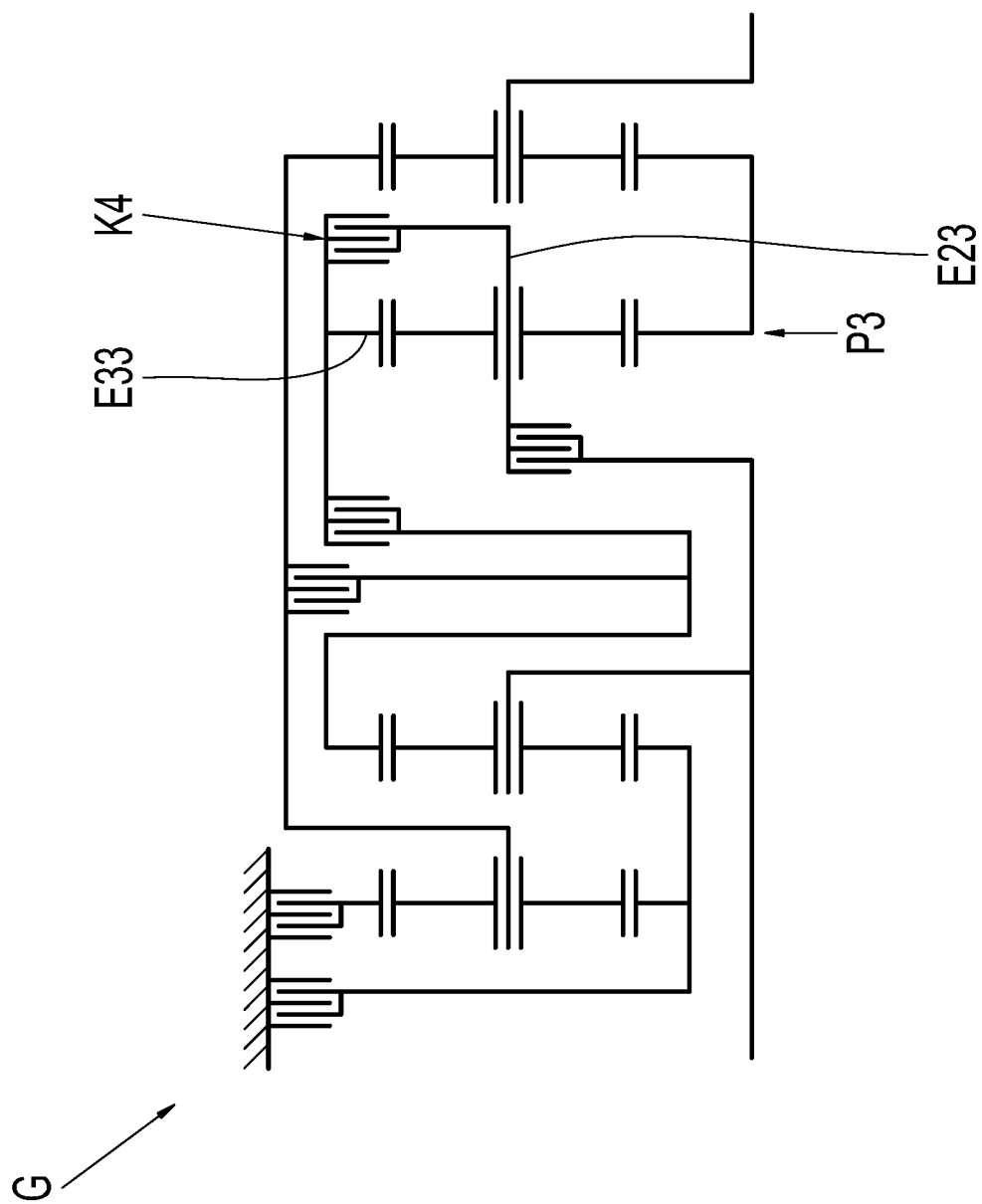
FIG. 8 shows a schematic view of a transmission according to a seventh embodiment of the invention.

In addition, FIG. 8 shows a schematic representation of a transmission G according to a seventh embodiment of the invention, which, for the most part, corresponds to the variant of FIG. 4. The only difference is that in this case a blocking of the third planetary gearset P3 is established by the sixth shift element K4 in the actuated state rotatably fixing the second element E23 of the third planetary gearset P3 and the third element E33 of the third planetary gearset P3 with each other. Apart from that, the embodiment depicted in FIG. 8 corresponds to the variant of FIG. 4, i.e. reference is made to the description thereof.

Figure 9:
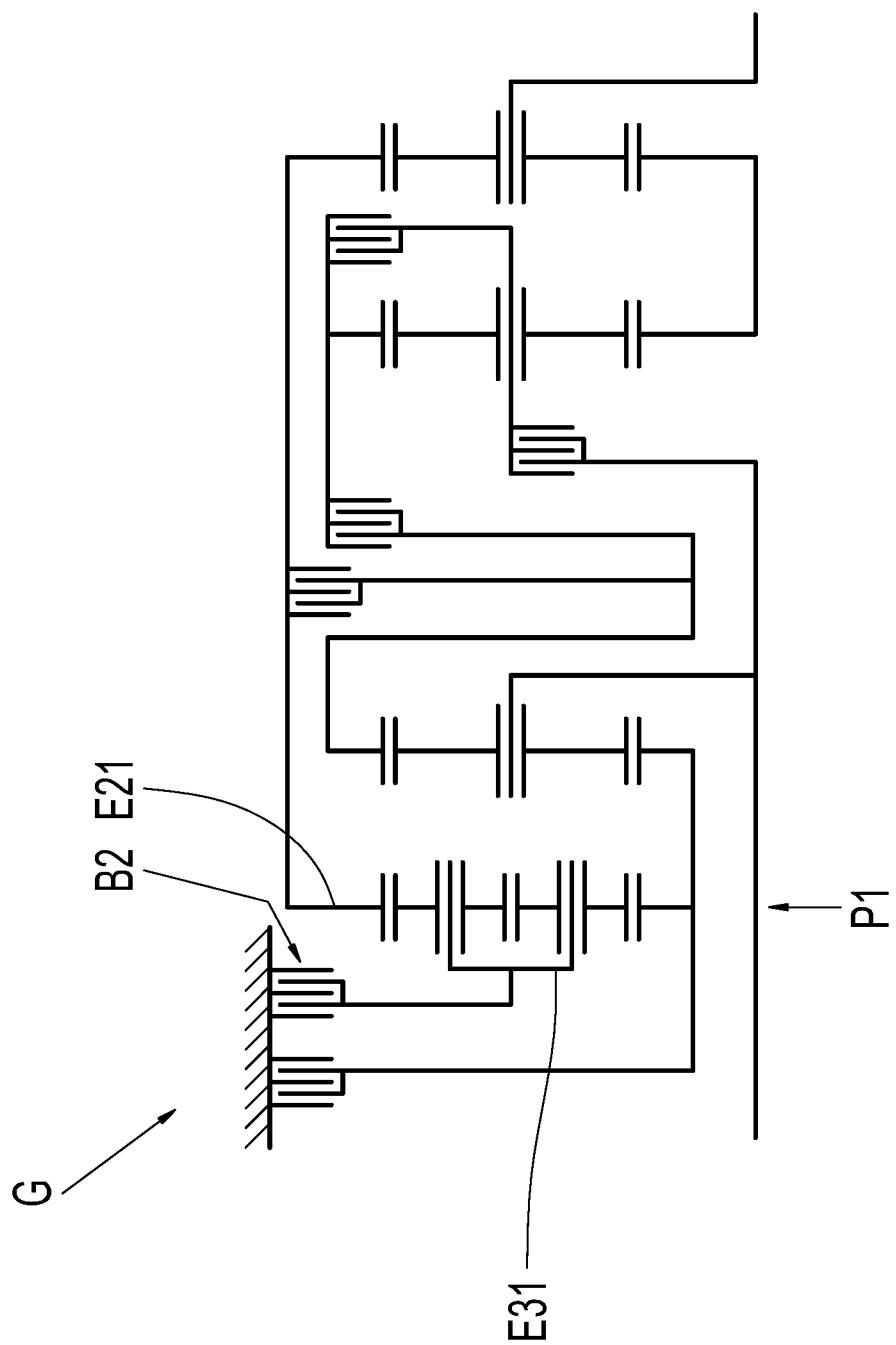
FIG. 9 shows a schematic representation of a transmission according to an eighth embodiment option of the invention.

FIG. 9 shows a schematic view of a transmission G according to an eighth embodiment option of the invention, which basically corresponds to the previous variant shown in FIG. 8. In contrast to the variant according to FIG. 8, in this case the first planetary gearset P1 is once again designed as a plus planetary gearset, in which the third element E31 is the planetary carrier and the second element E21 is the ring gear. At least one pair of planetary gears is rotatably mounted on the planetary carrier, one planetary gear of this pair of planetary gears is engaged with the radially inner sun gear and the other planetary gear engages the radially surrounding ring gear, and the planetary gears mesh with each other. In addition, the second shift element B2 is arranged axially on the transmission input GW1-A end facing the first planetary gearset P1. Otherwise, the embodiment according to FIG. 9 corresponds to the variant according to FIG. 8, i.e. reference is made to the description thereof.

Figure 10:
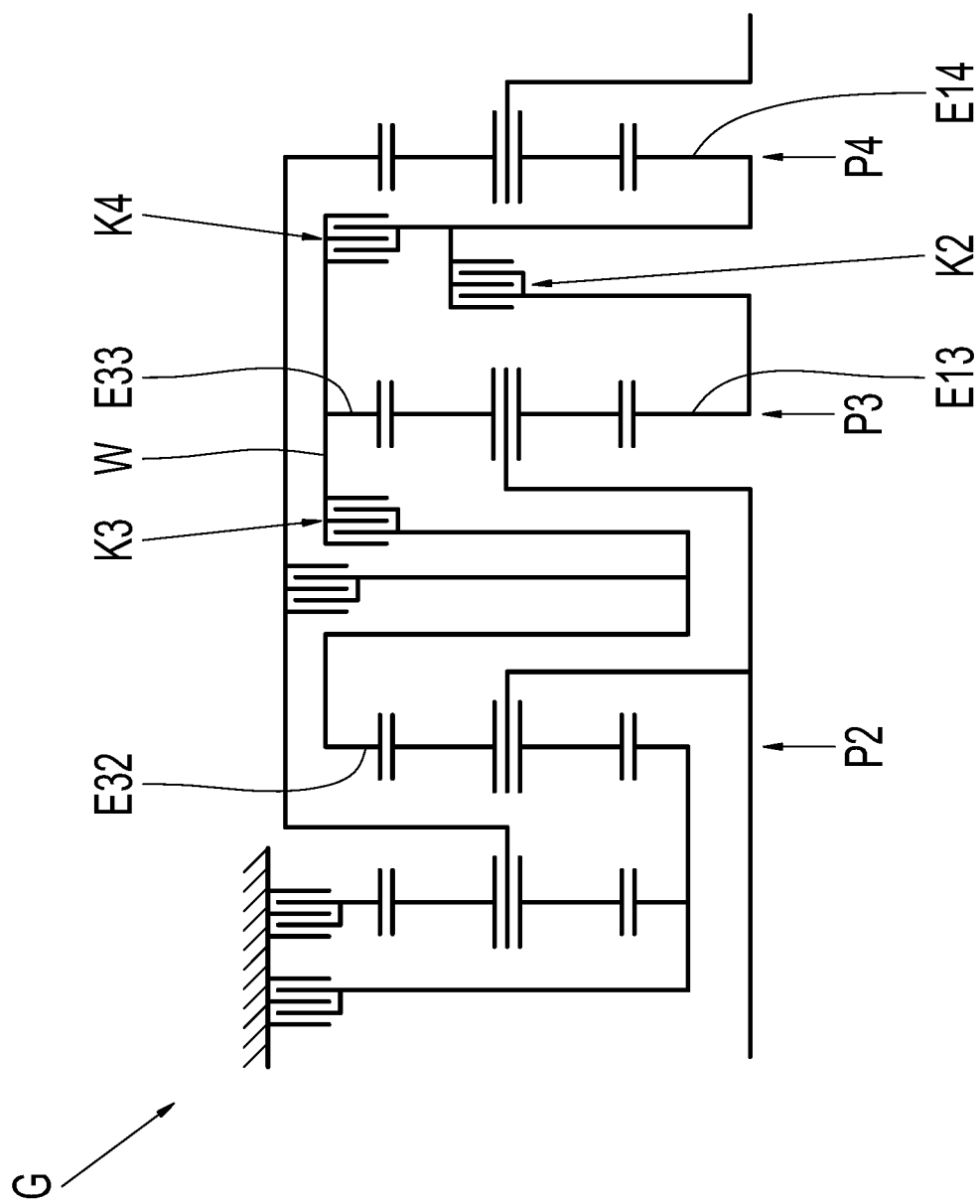
FIG. 10 shows a schematic view of a transmission according to a ninth embodiment of the invention.

FIG. 10 shows a schematic representation of a transmission G according to a ninth embodiment of the invention, which basically corresponds to the embodiment option of FIG. 2. In contrast to the variant according to FIG. 2, however, in this case the first element E13 of the third planetary gearset P3 and the first element E14 of the fourth planetary gearset P4 are not permanently rotatably fixed with each other, but a rotatably fixed connection is produced solely by closing the fourth shift element K2. Furthermore, the third element E33 of the third planetary gearset P3 is permanently rotatably engaged with the shaft W and can now, on the one hand, be rotatably engaged with the third element E32 of the second planetary gearset P2 by closing the fifth shift element K3, and, on the other hand, be rotatably engaged with the first element E14 of the fourth planetary gearset P4 by actuating the sixth shift element K4.

Due to the altered function of the fourth shift element K2, it is now placed axially between the third planetary gearset P3 and the fourth planetary gearset P4 compared to the variant of FIG. 2 and is located specifically basically at the same axial height as the sixth shift element K4, wherein the fourth shift element K2 is provided radially inwards of the sixth shift element K4. Apart from that, the embodiment according to FIG. 10 corresponds to the variant according to FIG. 2, i.e. reference is made to the description thereof.

Figure 11:
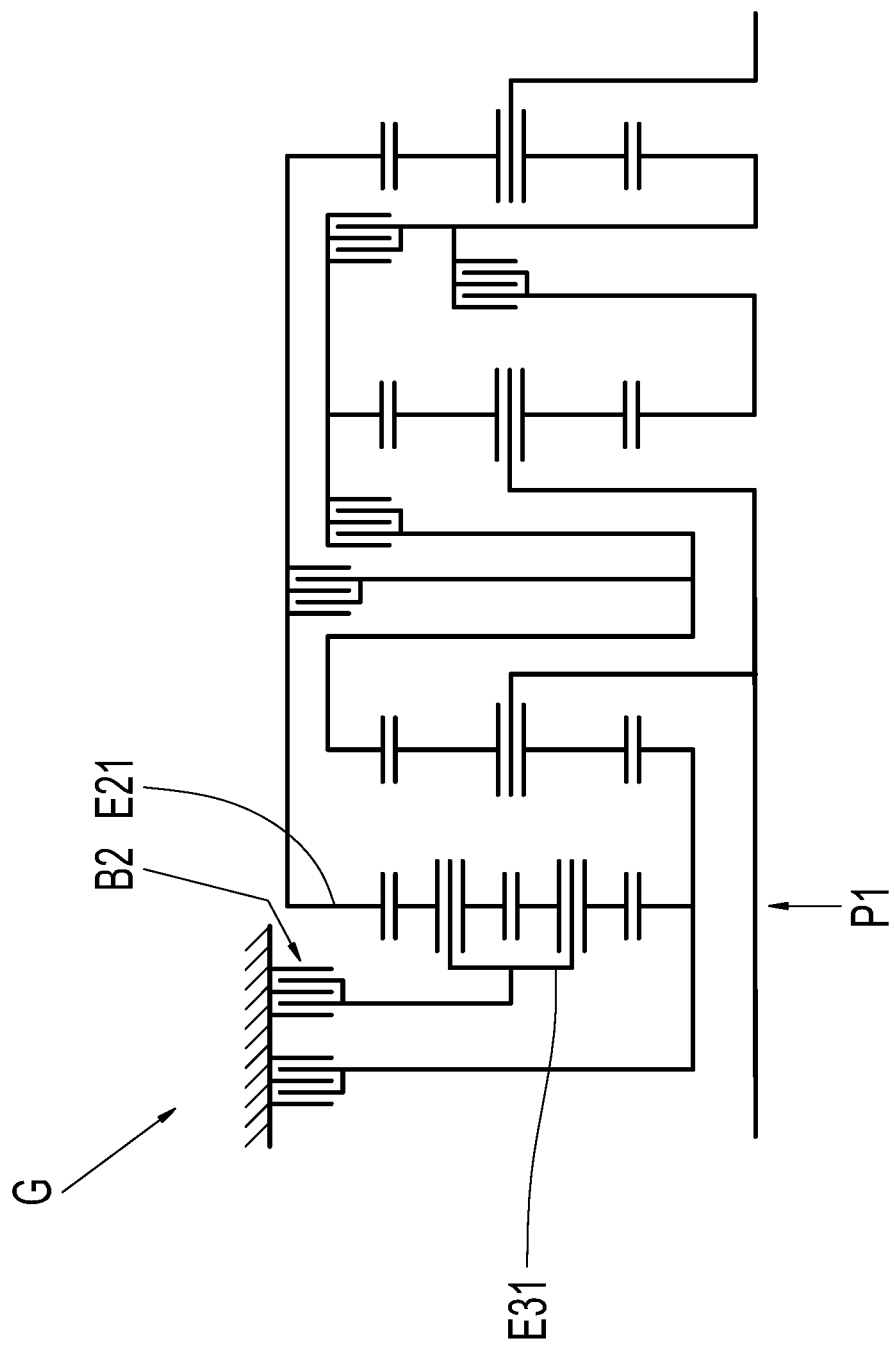
FIG. 11 shows a schematic representation of a transmission according to a tenth embodiment option of the invention.

FIG. 11 shows a schematic view of a transmission G according to a tenth embodiment option of the invention, which basically corresponds to the previous variant of FIG. 10. The difference is that the first planetary gearset P1 is once again designed as a plus-planetary gearset, in which the third element E31 is formed by the planetary carrier and the second element E21 by the ring gear. The planetary carrier has at least one pair of planetary gears, and of those planetary gears one planetary gear meshes with the radially inner sun gear and the other planetary gear meshes with the radially surrounding ring gear, and the planetary gears mesh with each other. As a further difference, the second shift element B2 is now arranged axially on the side of the first planetary gearset P1 facing the transmission input GW1-A. Otherwise, the embodiment according to FIG. 11 corresponds to the variant according to FIG. 10, i.e. reference is made to the description thereof.

Figure 12:
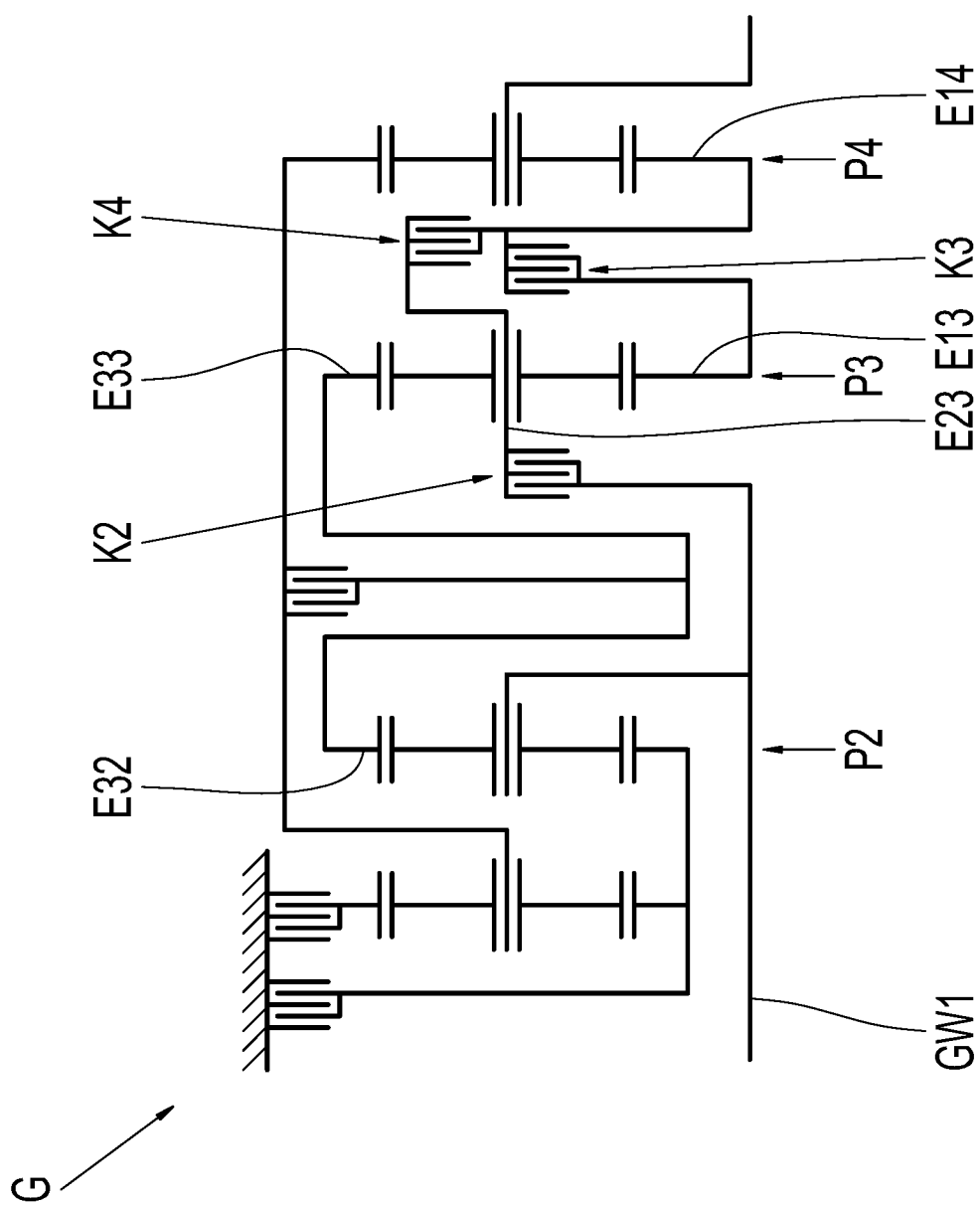
FIG. 12 shows a schematic view of a transmission according to an eleventh embodiment of the invention.

In addition, FIG. 12 shows a schematic representation of a transmission G according to an eleventh embodiment of the invention, wherein this embodiment largely corresponds to the variant according to FIG. 2. The difference is, however, that the drive shaft GW1 is no longer permanently rotatably fixed with the second element E23 of the third planetary gearset P3, but a rotatably fixed connection is made solely by closing the fourth shift element K2. As a further difference, the third element E33 of the third planetary gearset is now permanently rotatably fixed with the third element E32 of the second planetary gearset, whereas the first element E13 of the third planetary gearset P3 is solely rotatably fixed with the first element E14 of the fourth planetary gearset P4 by closing the fifth shift element K3.

The first element E14 of the fourth planetary gearset P4 can also be rotatably engaged with the second element E23 of the third planetary gearset P3 by means of the sixth shift element K4. Further, the fifth shift element K3 and the sixth shift element K4 are now placed together axially between the third planetary gearset P3 and the fourth planetary gearset P4, wherein these are axially adjacent to each other and the fifth shift element K3 is provided radially inwards of the sixth shift element K4. Finally, the fourth shift element K2 is arranged offset further radially inwards due to the now altered function in comparison to the variant of FIG. 2. Apart from that, the embodiment according to FIG. 12 corresponds to the variant according to FIG. 2, i.e. reference is made to the description thereof.

Figure 13:
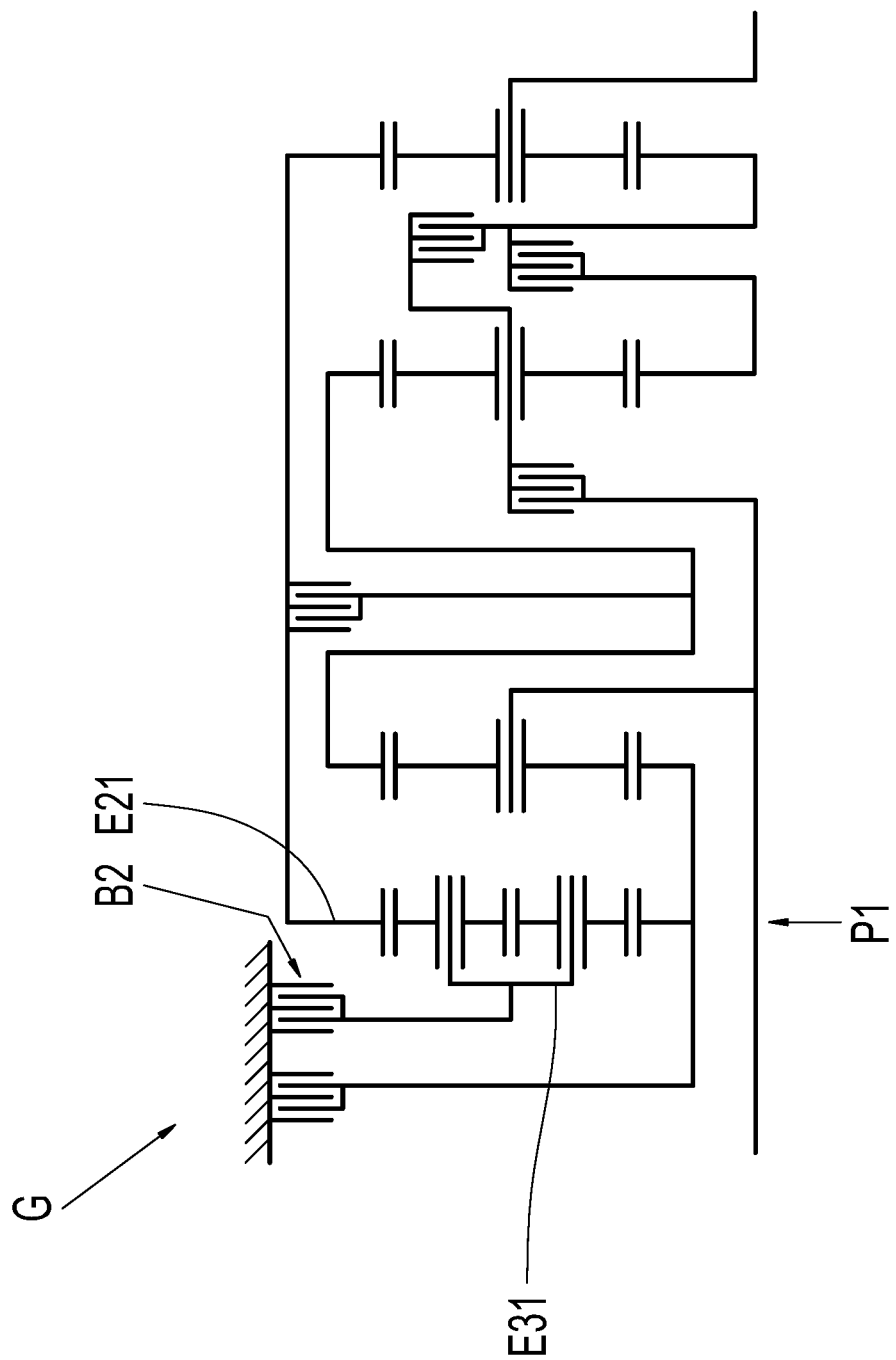
FIG. 13 shows a schematic representation of a transmission according to a twelfth embodiment option of the invention.

FIG. 13 shows a schematic view of a transmission G according to a twelfth embodiment option of the invention, which basically corresponds to the previous variant shown in FIG. 12. In contrast to the variant according to FIG. 12, in this case the first planetary gearset P1 is once again designed as a plus planetary gearset, in which the third element E31 is the planetary carrier and the second element E21 is the ring gear. At least one pair of planetary gears is rotatably mounted on the planetary carrier, one planetary gear of this pair of planetary gears is engaged with the radially inner sun gear and the other planetary gear engages with the radially surrounding ring gear, and the planetary gears mesh with each other. In addition, the second shift element B2 is arranged axially on the transmission input GW1-A end facing the first planetary gearset P1. Otherwise, the embodiment according to FIG. 13 corresponds to the variant according to FIG. 12, i.e. reference is made to the description thereof.

Figure 14:
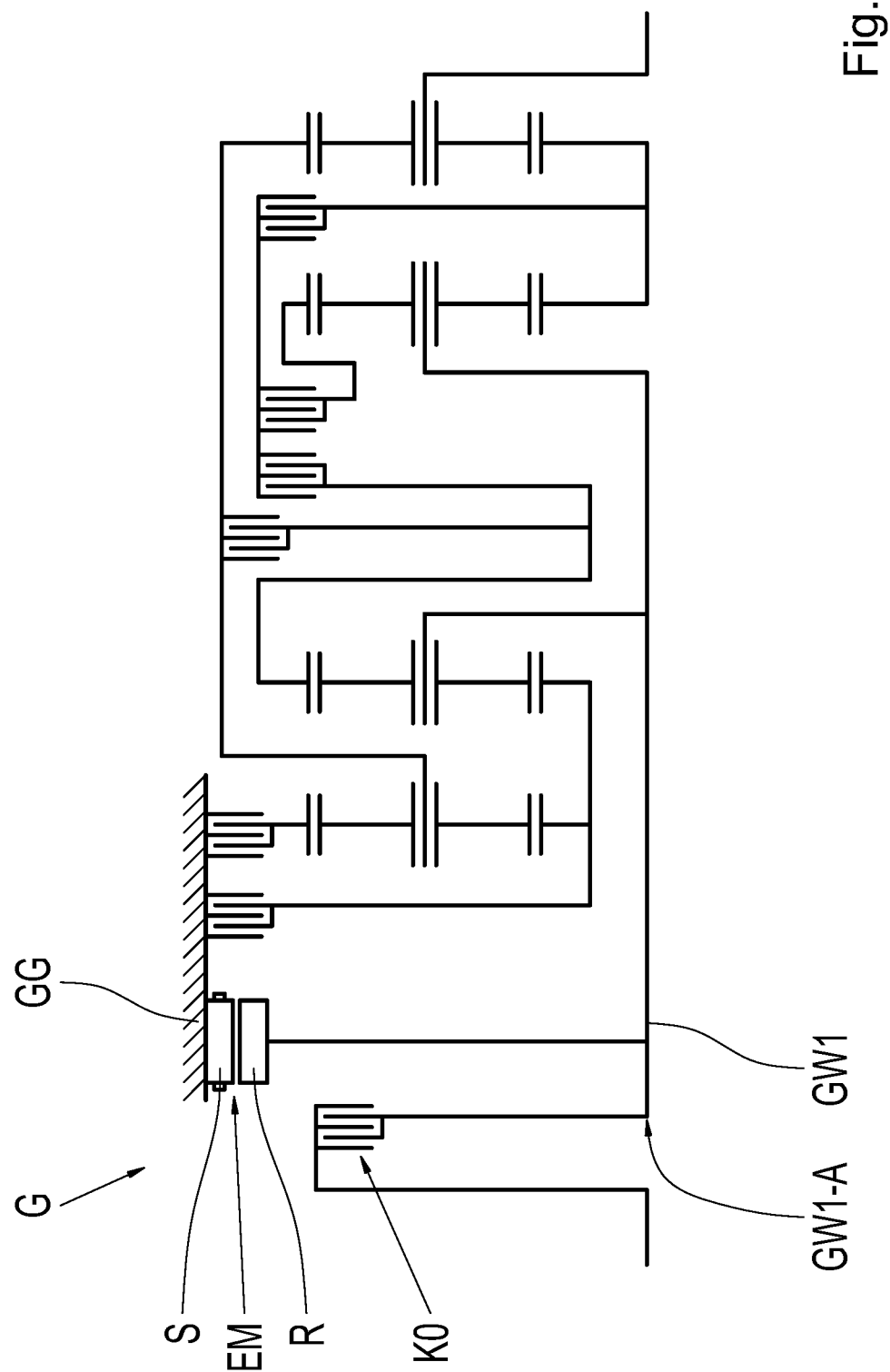
FIG. 14 shows a schematic view of a transmission according to a thirteenth embodiment of the invention.

Furthermore, FIG. 14 shows a schematic representation of a transmission G according to a thirteenth embodiment of the invention. This embodiment corresponds essentially to the variant of FIG. 2, wherein in contrast to that, an electric machine EM is additionally provided, whose stator S is fixed to a non-rotating component GG, whereas a rotor R of the electric machine EM is rotatably fixed with the drive shaft GW1. Furthermore, the drive shaft GW1 is rotatably fixed with a connecting shaft AN at the transmission input GW1-A via an intermediate separating clutch K0, which is designed in this case as a multi-disk shift element, which in turn is connected to a crankshaft of the internal combustion engine VKM by means of the intermediate torsional vibration damper TS. Due to the rotatably fixed connection of the rotor R with the drive shaft GW1, the electric machine EM is placed coaxially to the drive shaft GW1.

The electric machine EM can be used to implement the pure electric drive mode, wherein in that case the separating clutch K0 is opened to decouple the transmission input GW1-A from the connecting shaft AN and to not entrain the internal combustion engine VKM. Otherwise, the embodiment according to FIG. 14 corresponds to the variant according to FIG. 2, i.e. reference is made to the description thereof.

Figure 15:
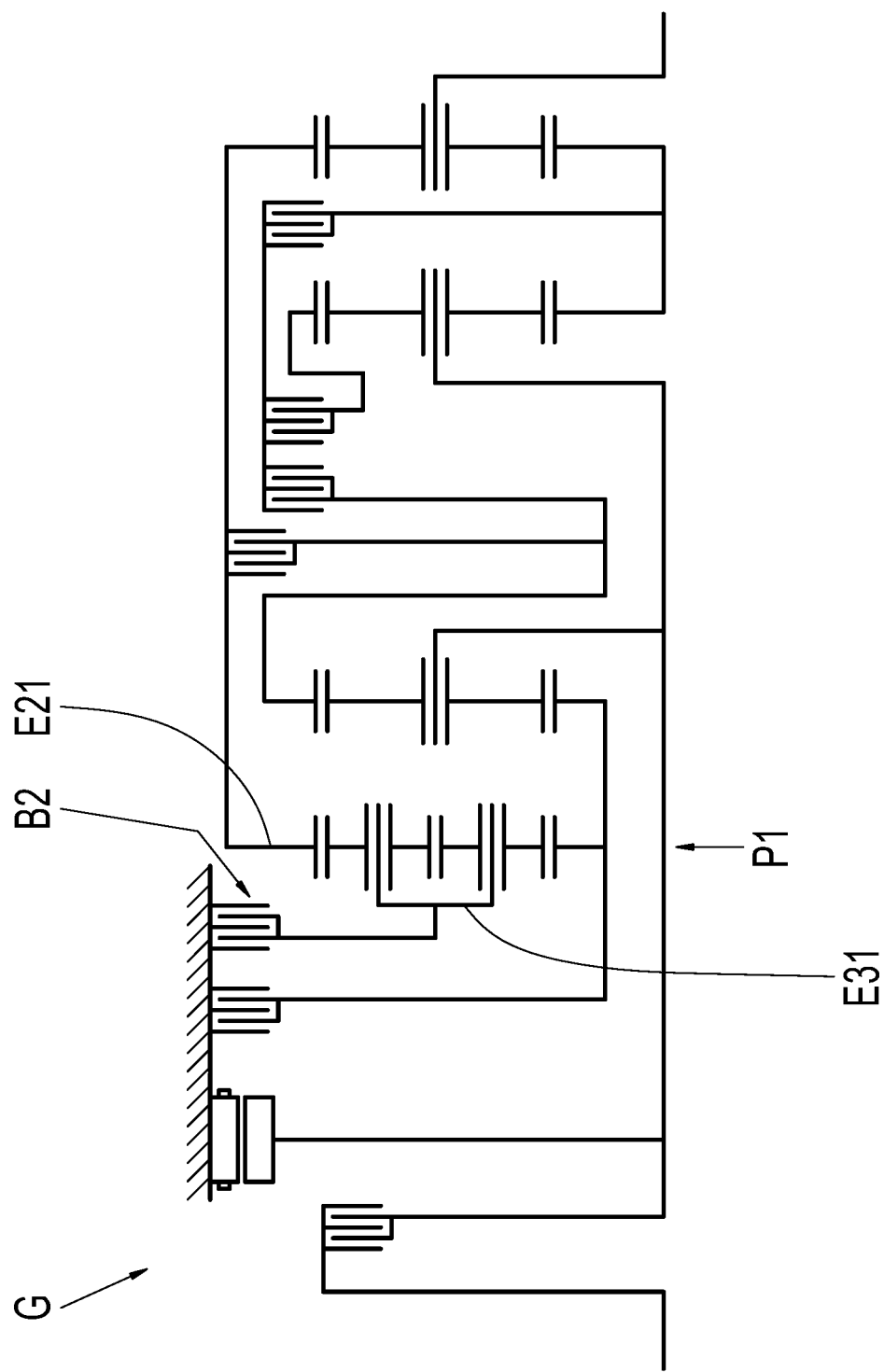
FIG. 15 shows a schematic representation of a transmission according to a fourteenth embodiment option of the invention.

Finally, FIG. 15 shows a schematic representation of a transmission G according to a fourteenth embodiment of the invention, which basically corresponds to the variant of FIG. 14. Again, the first planetary gearset P1 is designed as a plus-planetary gearset, in which the third element E31 is the planetary carrier and the second element E21 is the ring gear. At least one pair of planetary gears is rotatably mounted on the planetary carrier, one planetary gear of this pair of planetary gears is engaged with the radially inner sun gear and the other planetary gear engages with the radially surrounding ring gear, and the planetary gears mesh with each other. In addition, the second shift element B2 is arranged axially on the transmission input GW1-A side facing the first planetary gearset P1. Otherwise, the embodiment according to FIG. 15 corresponds to the variant according to FIG. 14, i.e. reference is made to the description thereof.

FIG. 16 shows an exemplary circuit diagram for the respective transmissions G of FIGS. 2 to 15 in tabular form. As can be seen, in each case a total of ten forward gears 1 to 10, and one reverse gear R1 can be implemented, wherein an X in the columns of the circuit diagram marks which of the shift elements B1, B2, K1, K2, K3 and K4 is closed for which of the forward gears 1 to 10 and the reverse gear R1, respectively. Four of the shift elements B1, B2, K1, K2, K3 and K4 each are closed in each of the forward gears 1 to 10 and the reverse gear R1, wherein to achieve the forward gears 1 to 10 in succession, one of the shift elements involved each has to be opened and one other shift element has to be subsequently closed.

As can be seen in FIG. 16, a first forward gear 1 is achieved by actuating the first shift element B1, the second shift element B2, the fourth shift element K2 and the sixth shift element K4, wherein, based on that, a second forward gear 2 is implemented by the fourth shift element K2 being opened and the fifth shift element K3 subsequently being closed. Furthermore, then a third forward gear 3 can be achieved by opening the first shift element B1 and closing the fourth shift element K2. On that basis, a fourth forward gear 4 is achieved by opening the fourth shift element K2 and closing the third shift element K1. Subsequently, a fifth forward gear 5 is achieved by opening the fifth shift element K3 and actuating the fourth shift element K2, wherein, on that basis, a sixth forward gear 6 is achieved by opening the sixth shift element K4 and closing the fifth shift element K3. To achieve a seventh forward gear 7, the second shift element B2 has to be opened and the sixth shift element K4 has to be closed.

Starting from the seventh forward gear 7, an eighth forward gear 8 is then achieved by changing the sixth shift element K4 to an unactuated state and the first shift element B1 to an actuated state. For further upshifting into a ninth forward gear 9, the fifth shift element K3 has to be opened and the sixth shift element K4 has to be closed. Finally, the tenth forward gear 10 is achieved from the ninth forward gear 9 by changing the fourth shift element K2 to an unactuated state and changing the fifth shift element K3 to an actuated state.

The reverse gear R1, in which a reverse travel of the motor vehicle can be implemented even when driven by the internal combustion engine VKM, however, is achieved by closing the first shift element B1, the second shift element B2, the fourth shift element K2 and the fifth shift element K3.

As shown in FIGS. 2 to 15, the second shift element B2 is designed as a non-positive shift element. However, the second shift element B2 could also be implemented as a form-locking shift element, such as, for instance, as a synchronizer unit or as a claw shift element.

Furthermore, the transmissions G in accordance with the embodiments of FIGS. 4 to 13 can also be hybridized in the manner of the variants according to FIGS. 14 and 15.

A transmission having a compact design and a good efficiency can be implemented by means of the embodiments according to the invention.

REFERENCE NUMERALS

G Transmission
GG Non-rotating component
P1 First planetary gearset
E1 First element of the first planetary gearset
E21 Second element of the first planetary gearset
E31 Third element of the first planetary gearset
P2 Second planetary gearset
E12 First element of the second planetary gearset
E22 Second element of the second planetary gearset
E32 Third element of the second planetary gearset
P3 Third planetary gearset
E13 First element of the third planetary gearset
E23 Second element of the third planetary gearset
E33 Third element of the third planetary gearset
P4 Fourth planetary gearset
E14 First element of the fourth planetary gearset
E24 Second element of the fourth planetary gearset
E34 Third element of the fourth planetary gearset
B1 first shift element
B2 second shift element
K1 third shift element
K2 fourth shift element
K3 fifth shift element
K4 sixth shift element
1 first forward gear
2 second forward gear
3 third forward gear
4 fourth forward gear
5 fifth forward gear
6 sixth forward gear
7 seventh forward
8 eighth forward gear
9 ninth forward gear
10 tenth forward gear
R1 reverse gear
GW1 drive shaft
GW1-A transmission input
GW2 output shaft
GW2-A transmission output
EM electric machine
S stator
R rotor
R rotor
K0 clutch
W shaft
VKM internal combustion engine
TS torsional vibration damper
AG axle gearing
DW drive wheels

The invention claimed is:

1. A transmission for a motor vehicle, the transmission comprising:
a transmission input,
a transmission output,
a first planetary gearset,
a second planetary gearset,
a third planetary gearset,
a fourth planetary gearset,
the first, the second, the third and the fourth planetary gearsets each comprising a plurality of elements, a first element of the respective planetary gearsets being formed as a sun gear, a second element of the respective planetary gearsets being formed as a planetary carrier, in a case of a minus planetary gearset, and as a ring gear, in a case of a plus planetary gearset, and a third element of the respective planetary gearsets being formed as the ring gear, in the case of the minus planetary gearset, and as the planetary carrier, in the case of the plus planetary gearset,
a first shift element,
a second shift element,
a third shift element,
a fourth shift element,
a fifth shift element,
a sixth shift element,
selective actuation of four of the first, the second, the third, the fourth, the fifth, and the sixth shift elements implementing different flow paths of power on the first, the second, the third, and the fourth planetary gearsets by achieving different gears ratios between the transmission input and transmission output;
the first element of the first planetary gearset and the first element of the second planetary gearset being rotatably fixed with one another and being jointly fixable, via the first shift element, to a non-rotating component;
the third element of the first planetary gearset being fixable, via the second shift element, to the non-rotating component;
the second element of the first planetary gearset and the third element of the fourth planetary gearset being permanently rotatably fixed with one another;
the transmission input being rotatably fixed with the second element of the second planetary gearset;
the transmission output being rotatably fixed with the second element of the fourth planetary gearset;
the second element of the first planetary gearset and the third element of the fourth planetary gearset both being jointly rotatably fixable, via the third shift element, with the third element of the second planetary gearset; and
the third elements of the second and the third planetary gearsets are either permanently rotatably fixed with one another or are rotatably fixable with one another by engagement of at least one of the fifth and the fourth shift elements.

2. The transmission according to claim 1, wherein the third element of the third planetary gearset is rotatably fixable by engagement of the fourth shift element with a shaft,
the shaft is rotatably fixable by engagement of the fifth shift element with the third element of the second planetary gearset, and, by engagement of the sixth shift element, the shaft is rotatably fixed with the first element of the third planetary gearset and the first element of the fourth planetary gearset, and the second element of the third planetary gearset is rotatably fixed with the transmission input.

3. The transmission according to claim 1, wherein the second element of the third planetary gearset is rotatably fixable, by engagement of the fourth shift element, with the transmission input, the first element of the third planetary gearset is rotatably engaged with the first element of the fourth planetary gearset, the third element of the third planetary gearset is rotatably engaged, by engagement of the fifth shift element, with the third element of the second planetary gearset, and the third planetary gearset is blocked by engagement of the sixth shift element.

4. The transmission according to claim 3, wherein engagement of the sixth shift element rotatably fixes either:

the first element and the third element of the third planetary gearset, the first element and the second element of the third planetary gearset, or the second element and the third element of the third planetary gearset with one another.

5. The transmission according to claim 1, wherein the second element of the third planetary gearset is rotatably fixed by engagement of the fourth shift element with the transmission input, the third element of the third planetary gearset is rotatably fixed with the third element of the second planetary gearset, the first element of the third planetary gearset is rotatably fixable by engagement of the fifth shift element with the first element of the fourth planetary gearset, and the first element of the fourth planetary gearset is rotatably fixable with the second element of the third planetary gearset by engagement of the sixth shift element.

6. The transmission according to claim 1, wherein the second element of the third planetary gearset is rotatably fixed with the transmission input, the first element of the third planetary gearset is rotatably fixable with the first element of the fourth planetary gearset by engagement of the fourth shift element, the first element of the fourth planetary gearset is rotatably fixable by engagement of the sixth shift element with the third element of the third planetary gearset, and the third element of the third planetary gearset is rotatably fixable by engagement of the fifth shift element with the third element of the second planetary gearset.

7. The transmission according to claim 1, wherein a first forward gear is implemented by engagement of the first, the second, the fourth and the sixth shift elements, a second forward gear is implemented by engagement of the first, the second, the fifth and the sixth shift elements, a third forward gear is implemented by engagement of the second, the fourth, the fifth and the sixth shift elements, a fourth forward gear is implemented by engagement of the second, the third, the fifth and the sixth shift elements, a fifth forward gear is implemented by engagement of the second, the third, the fourth and the sixth shift elements, a sixth forward gear is implemented by engagement of the second, the third, the fourth and the fifth shift elements, a seventh forward gear is implemented by engagement of the third, the fourth, the fifth and the sixth shift elements, an eighth forward gear is implemented by engagement of the first, the third, the fourth and the fifth shift elements, a ninth forward gear is implemented by engagement of the first, the third, the fourth and the sixth shift elements, a tenth forward gear is implemented by engagement of the first, the third, the fifth and the sixth shift elements, and a reverse gear is implemented by engagement of the first, the second, the fourth and the fifth shift elements.

8. The transmission according to claim 1, wherein the first, the second, the third and the fourth planetary gearsets are minus planetary gearsets; and the first elements of the third and the fourth planetary gearsets are either permanently rotatably fixed with one another or are rotatably fixable with one another by engagement of one of the fifth and the fourth shift elements.

9. The transmission according to claim 1, wherein the first planetary gearset is a plus planetary gearset, and the second, the third and the fourth planetary gearsets are each minus planetary gearsets.

10. The transmission according to claim 1, wherein the transmission input is formed at a drive shaft and the transmission output is formed at an output shaft, and the drive shaft and the output shaft are coaxial to each other.

11. The transmission according to claim 1, wherein at least one of the first, the second, the third, the fourth, the fifth and the six shift elements is a force-locking shift element.

12. The transmission according to claim 1, wherein the second shift element is a positive shift element.

13. The transmission according to claim 1, further comprising an electric machine having a rotor which is coupled to a rotatable component.

14. The transmission according to claim 1, further comprising an additional clutch which is engable to rotationally fix the transmission input with a connecting shaft.

15. A motor vehicle drive train comprising a transmission comprising:

a transmission input,
a transmission output,
a first planetary gearset,
a second planetary gearset,
a third planetary gearset,
a fourth planetary gearset,
the first, the second, the third and the fourth planetary gearsets each comprising a plurality of elements, a first element of the respective planetary gearsets being formed as a sun gear, a second element of the respective planetary gearsets being formed as a planetary carrier, in a case of a minus planetary gearset, and as a ring gear, in a case of a plus planetary gearset, and a third element of the respective planetary gearsets being formed as the ring gear, in the case of the minus planetary gearset, and as the planetary carrier, in the case of the plus planetary gearset,
a first shift element,
a second shift element,
a third shift element,
a fourth shift element,
a fifth shift element,
a sixth shift element,
selective actuation of four of the first, the second, the third, the fourth, the fifth, and the sixth shift elements implementing different flow paths of power on the first, the second, the third, and the fourth planetary gearsets by achieving different gears ratios (1 to 10, R1) between the transmission input and transmission output;

the first element of the first planetary gearset and the first element of the second planetary gearset being rotatably fixed with one another and being jointly fixable, via the first shift element, to a non-rotating component;

the third element of the first planetary gearset being fixable, via the second shift element, to the non-rotating component;

the second element of the first planetary gearset and the third element of the fourth planetary gearset being permanently rotatably fixed with one another;

the transmission input being rotatably fixed with the second element of the second planetary gearset;

the transmission output being rotatably fixed with the second element of the fourth planetary gearset;

the second element of the first planetary gearset and the third element of the fourth planetary gearset both being jointly rotatably fixable, via the third shift element, with the third element of the second planetary gearset; and the third elements of the second and the third planetary gearsets are either permanently rotatably fixed with one another or are rotatably fixable with one another by engagement of at least one of the fifth and the fourth shift elements.

16. A transmission for a motor vehicle, the transmission comprising:

a transmission input;

a transmission output;

first, second, third and fourth planetary gearsets, the first, the second, the third and the fourth planetary gearsets respectively being either a plus planetary gearset or a minus planetary gearset, each of the first, the second, the third and the fourth planetary gearsets having first, second and third elements, the first element of each planetary gearset being a sun gear, and, if the planetary gearset is a plus planetary gearset, then the second element is a ring gear and the third element is a planetary carrier, otherwise, if the planetary gearset is a minus planetary gearset, then the second element is the planetary carrier and the third element is the ring gear;

first, second, third, fourth, fifth, and sixth shift elements, and selective engagement of four of the first, the second, the third, the fourth, the fifth, and the sixth shift elements implementing a plurality gear ratios in a flow of drive power through the first, the second, the third and the fourth planetary gearsets from the transmission input to the transmission output;

the first element of the first planetary gearset and the first element of the second planetary gearset being connected to one another in a rotationally fixed manner, and connectable to a housing in a rotationally fixed manner by engagement of the first shift element;

the third element of the first planetary gearset being connectable to the housing in a rotationally fixed manner by engagement of the second shift element;

the second element of the first planetary gearset and the third element of the fourth planetary gearset being connected to one another in a rotationally fixed manner;

the transmission input being connected to the second element of the second planetary gearset in a rotationally fixed manner, and the transmission output being connected to the second element of the fourth planetary gearset in a rotationally fixed manner;

the second element of the first planetary gearset and the third element of the fourth planetary gearset being connectable to the third element of the second planetary gearset in a rotationally fixed manner by engagement of the third shift element; and the third elements of the second and the third planetary gearsets are either permanently rotatably fixed with one another or are rotatably fixable with one another by engagement of at least one of the fifth and the fourth shift elements.

\* \* \* \* \*